(12) United States Patent
Qian et al.

(10) Patent No.: US 6,453,273 B1
(45) Date of Patent: *Sep. 17, 2002

(54) SYSTEM FOR ANALYZING SIGNALS GENERATED BY ROTATING MACHINES

(75) Inventors: Shie Qian, Austin, TX (US); Hui Shao; Wei Jin, both of Shanghai (CN)

(73) Assignee: National Instruments Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/974,402

(22) Filed: Oct. 9, 2001

Related U.S. Application Data

(60) Division of application No. 09/636,097, filed on Aug. 10, 2000, now Pat. No. 6,366,862, which is a continuation-in-part of application No. 09/551,924, filed on Apr. 19, 2000, now Pat. No. 6,332,116.

(51) Int. Cl.[7] .............................................. G01P 21/02
(52) U.S. Cl. ......................... 702/190; 702/56; 708/401
(58) Field of Search ........................ 702/190, 56, 182, 702/183; 708/400, 401; 340/679, 683

(56) References Cited

U.S. PATENT DOCUMENTS

| | | | |
|---|---|---|---|
| 4,426,641 A | | 1/1984 | Kurihara et al. |
| 4,599,567 A | | 7/1986 | Goupillaud et al. |
| 4,667,297 A | | 5/1987 | Kawai |
| 4,912,661 A | | 3/1990 | Potter |
| 4,961,364 A | | 10/1990 | Tsutsumi et al. |
| 5,353,233 A | * | 10/1994 | Qian et al. ................ 702/76 |
| 5,365,787 A | | 11/1994 | Hernandez et al. |
| 5,404,377 A | | 4/1995 | Moses |
| 5,439,483 A | | 8/1995 | Duong-Van |
| 5,473,555 A | | 12/1995 | Potter |
| 5,486,833 A | | 1/1996 | Barrett |
| 5,594,175 A | | 1/1997 | Lyon et al. |

(List continued on next page.)

OTHER PUBLICATIONS

Qian et al., "Understanding the Nature of Signals Whose Power Spectra Change with Time", IEEE, 1999.*

Xia et al., "Gabor Transforms: Some New Properties on the Gabor Transform Matrix", IEEE, 1998.*

Qian et al., "A Fast Gabor Spectrogram", IEEE, Jun. 5–9, 2000.*

"Order Analysis," Realtime Update, Fall 1996–Winter 1997, Hewlett–Packard, p. 1.

Technical Review No. 1—1999, © Brüel & Kjaer Sound & Vibration Measurement A/S, "Characteristics of the Vold–Kalman Order Tracking Filter by S. Gade et al.," pp. 1–59.

(List continued on next page.)

Primary Examiner—Patrick Assouad
(74) Attorney, Agent, or Firm—Conley, Rose & Tayon PC; Jeffrey C. Hood

(57) ABSTRACT

A signal analysis system and method for analyzing an input signal acquired from a mechanical system. The mechanical system may include at least one rotating apparatus. The signal analysis system may include an input for receiving samples of an input signal acquired from the mechanical system, wherein the input signal is sampled in time, and wherein the input signal comprises a plurality of order components. The signal analysis system may also include a processor coupled to the input and a memory medium coupled to the processor which stores analysis software. The processor may be operable to execute the analysis software to: (a) perform an invertible joint time-frequency transform on the input signal to produce a first array of coefficients which depend on time and frequency; (b) generate a modified array of coefficients from the first array of coefficients, wherein the modified array of coefficients corresponds to a desired subset of the plurality of order components; and (c) generate a time domain signal from the modified array of coefficients. The signal analysis system may also include a presentation device coupled to the processor which is operable to present the time domain signal to a user. The time domain signal is useable in analyzing operation of the rotating apparatus in the mechanical system.

28 Claims, 18 Drawing Sheets

U.S. PATENT DOCUMENTS

| | | | |
|---|---|---|---|
| 5,686,669 | A | 11/1997 | Hernandez et al. |
| 5,717,141 | A | 2/1998 | Kikuchi et al. |
| 5,729,694 | A | 3/1998 | Holzrichter et al. |
| H1720 | H | 4/1998 | Chen |
| 5,744,723 | A | 4/1998 | Piety |
| H1726 | H | 5/1998 | Chen |
| 5,776,063 | A | 7/1998 | Dittrich et al. |
| 5,784,273 | A | 7/1998 | Madhaven |
| 5,825,657 | A | 10/1998 | Hernandez |
| 5,845,241 | A | 12/1998 | Owechko |
| 5,852,567 | A * | 12/1998 | Xia et al. .................... 702/76 |
| 5,903,819 | A | 5/1999 | Romesburg |
| 5,995,868 | A | 11/1999 | Dorfmeister et al. |
| 5,995,910 | A * | 11/1999 | Discenzo ..................... 702/34 |
| 6,011,816 | A | 1/2000 | Sanielevici et al. |
| 6,036,653 | A | 3/2000 | Baba et al. |
| 6,041,287 | A * | 3/2000 | Dister et al. ............... 702/182 |
| 6,057,924 | A | 5/2000 | Ross et al. |
| 6,108,609 | A * | 8/2000 | Qian et al. .................. 382/207 |
| 6,131,013 | A | 10/2000 | Bergstrom et al. |
| 6,157,899 | A | 12/2000 | Venkataraman et al. |
| 6,199,019 | B1 * | 3/2001 | Iino et al. .................. 702/109 |
| 6,287,328 | B1 * | 9/2001 | Snyder et al. ............... 600/509 |
| 6,295,510 | B1 * | 9/2001 | Discenzo ..................... 310/50 |
| 6,324,487 | B1 * | 11/2001 | Qian et al. .................. 702/147 |
| 6,326,758 | B1 * | 12/2001 | Discenzo ..................... 318/432 |
| 6,332,116 | B1 * | 12/2001 | Qian et al. .................. 340/683 |

OTHER PUBLICATIONS

Herlufsen et al., "Characteristics of the Vold/Kalman Order Tracking Filter," Sound & Vibration, Apr. 1999, pp. 2–8.

Vold et al., "Multi Axle Order Tracking with the Vold–Kalman Tracking Filter," Sound & Vibration, May 1997, pp. 30–34.

Gade et al., "Order Tracking Analysis," 1995, 47 pgs.

Product Data, Vold–Kalman Order Tracking Filter, 1998, pp. 1–7.

Product Data, Order Tracking Analyzer, 1995, pp. 1–7.

"Effective Machinery Measurements using Dynamic Signal Analyzers," Hewlett–Packard Co. 1997, pp. 3–84.

Roush Industries "Noise and Vibration Training Course for Test Engineers and Technicians", May 1999.

* cited by examiner

230

```
Compute an instantaneous rotation frequency signal
with respect to time in response to the rotation
indicator signal R.
310
```

```
Multiply the instantaneous rotation frequency signal
$F_1(t)$ by an order number C to generate an
instantaneous order frequency curve.
320
```

```
Construct the order mask array by setting
coefficients of the order mask array equal to one in
a time-frequency neighborhood of the order
frequency curve, and zero outside the time-
frequency neighborhood.
330
```

Fig. 7

$$\begin{bmatrix} t(\theta_{i-2})-t(\theta_i) \\ t(\theta_{i-1})-t(\theta_i) \\ t(\theta_{i+1})-t(\theta_i) \\ t(\theta_{i+2})-t(\theta_i) \end{bmatrix} = \begin{bmatrix} -2\Delta\theta & \frac{(-2\Delta\theta)^2}{2} & \frac{(-2\Delta\theta)^3}{6} & \frac{(-2\Delta\theta)^4}{24} \\ -\Delta\theta & \frac{(-\Delta\theta)^2}{2} & \frac{(-\Delta\theta)^3}{6} & \frac{(-\Delta\theta)^4}{24} \\ \Delta\theta & \frac{\Delta\theta^2}{2} & \frac{\Delta\theta^3}{6} & \frac{\Delta\theta^4}{24} \\ 2\Delta\theta & \frac{(2\Delta\theta)^2}{2} & \frac{(2\Delta\theta)^3}{6} & \frac{(2\Delta\theta)^4}{24} \end{bmatrix} \begin{bmatrix} t'(\theta_i) \\ t''(\theta_i) \\ t'''(\theta_i) \\ t^{(4)}(\theta_i) \end{bmatrix}$$

Fig. 10A inverse matrix H $$\begin{bmatrix} \frac{1}{(12\cdot\Delta\theta)} & \frac{-2}{(3\cdot\Delta\theta)} & \frac{2}{(3\cdot\Delta\theta)} & \frac{-1}{(12\cdot\Delta\theta)} \\ \frac{-1}{(12\cdot\Delta\theta^2)} & \frac{4}{(3\cdot\Delta\theta^2)} & \frac{4}{(3\cdot\Delta\theta^2)} & \frac{-1}{(12\cdot\Delta\theta^2)} \\ \frac{-1}{(2\cdot\Delta\theta^3)} & \frac{1}{\Delta\theta^3} & \frac{-1}{\Delta\theta^3} & \frac{1}{(2\cdot\Delta\theta^3)} \\ \frac{1}{\Delta\theta^4} & \frac{-4}{\Delta\theta^4} & \frac{-4}{\Delta\theta^4} & \frac{1}{\Delta\theta^4} \end{bmatrix}$$

Fig. 10B $$\begin{bmatrix} 2\Delta\theta & 0 & \frac{\Delta\theta^3}{3} & 0 \\ 4\Delta\theta & 0 & \frac{(2\Delta\theta)^3}{3} & 0 \end{bmatrix} \begin{bmatrix} t'(\theta_k) \\ t''(\theta_k) \\ t'''(\theta_k) \\ t^{(4)}(\theta_k) \end{bmatrix} = \begin{bmatrix} t(\theta_{k+1})-t(\theta_{k-1}) \\ t(\theta_{k+2})-t(\theta_{k-2}) \end{bmatrix}$$

Fig. 10C

SYSTEM FOR ANALYZING SIGNALS GENERATED BY ROTATING MACHINES

CONTINUATION DATA

This application is a Divisional of U.S. Patent application Ser. No. 09/636,097 titled "System and Method for Analyzing signals Generated by Rotating Machines" whose inventors are Shie Qian, Hui Shao and Wei Jin, which was filed on Aug. 10, 2000, now U.S. Pat. No. 6,366,862 which is a Continuation in Part of U.S. patent application 09/551,924 titled "System and Method for Analyzing Signals of Rotating Machines" whose inventors are Shie Qian and Hui Shao, which was filed on Apr. 19, 2000 now U.S. Pat. No. 6,332,116.

FIELD OF THE INVENTION

The invention relates generally to signal analysis systems or test and measurement systems, and more particularly to a system and method for analyzing order components of a signal generated by a physical system (e.g., a mechanical system containing one or more rotating elements).

DESCRIPTION OF THE RELATED ART

Scientists and engineers often use test and measurement systems and data acquisition systems to perform a variety of functions, including laboratory research, process monitoring and control, data logging, analytical chemistry, test and analysis of physical phenomena and analysis or control of mechanical or electrical machinery, to name a few examples. One example of hardware to implement such measuring systems is a computer-based measurement system or data acquisition (DAQ) system. Another example of a measurement system is a dedicated instrument, such as a dedicated oscilloscope or signal analyzer.

A measurement system typically may include transducers for measuring and/or providing electrical signals, signal conditioning hardware which may perform amplification, isolation and/or filtering, and measurement or DAQ hardware for receiving digital and analog signals and providing them to a processing system, such as a processor or personal computer. The computer-based measurement system or dedicated instrument may further include analysis hardware and software for analyzing and appropriately displaying the measured data.

One example where measurement and data acquisition systems are used is in the field of rotating machinery analysis. This involves the analysis of physical signals such as vibration or acoustic signals from a rotating machine. A physical signal acquired from a rotating machine may be sampled or digitized. Typically, samples of the physical signal are equidistant in time. However, rotating machines generate signals which are periodic with respect to shaft rotation, i.e., rotation angle of an underlying rotating element (e.g. a crank shaft of an engine). These rotation-periodic signals are referred to herein as order components. When the rotation rate changes in time, the order components change correspondingly in frequency. For example, when the rotation rate increases, the order components increase in frequency. Thus, a traditional analysis method such as the Discrete Fourier Transform (DFT), when applied to the physical signal, displays a frequency smearing of order components. The frequency smearing makes it very difficult to derive meaningful information about the order components. Thus, traditional signal analysis methods such as the Fourier Transform of the time domain input signal are not well suited for analyzing order components generated by rotating machines.

In order to better analyze the performance and characteristics of rotating machines, certain prior art systems convert the time-samples, i.e., the samples of the physical signal which are equally spaced in time, to angle-samples, i.e. samples which are equally spaced in shaft angle. For example, U.S. Pat. No. 4,912,661 assigned to Hewlett-Packard discloses an interpolation method for estimating angle-samples from time-samples. The method disclosed in U.S. Pat. No. 4,912,661 performs an interpolation of the time domain signal, followed by a decimation, in order to produce samples equally spaced with respect to shaft angle. The order components may then be analyzed by performing a traditional analysis method such as the Discrete Fourier Transform on the angle-samples. However, this method is expensive in terms of computational resources and may not be very accurate.

One prior art system known as the Vold-Kalman filter, developed by Bruel and Kjaer, allows the user to track the frequency of an order component given a sufficiently accurate model, i.e., a stochastic model, for the physical signal. The Vold-Kalman filter performance may be strongly sensitive to model accuracy. In other words, the tracking performance is likely to be degraded when an inaccurate signal model is supplied to the filter. Furthermore, the Vold-Kalman filter provides no mechanism for the user to evaluate the accuracy of the frequency tracking for an order component.

Therefore, there exists a need for a system and method which could more accurately and robustly analyze order components of a physical signal, and reconstruct desired order components in the time-domain.

SUMMARY OF THE INVENTION

One embodiment of the present invention comprises a signal analysis system (or measurement system) and method for analyzing an input signal acquired from a physical or mechanical system. The mechanical system may include at least one rotating apparatus. The signal analysis system may be configured to: (a) receive samples of the input signal, (b) perform an invertible joint time-frequency transform (e.g., a Gabor transform) on the samples of the input signal to produce an initial array of coefficients which depend on time and frequency, (c) generate a modified array of coefficients from the initial array of coefficients, (d) generate a time domain signal from the modified array of coefficients, e.g., by performing an inverse joint time-frequency transform on the modified array of coefficients, and (e) present the time domain signal to a user on a presentation device. The input signal is preferably a time domain input signal, i.e., the samples are sampled in time, preferably uniformly in time.

The joint time-frequency transform is invertible, meaning that any time-domain input signal (or an approximation thereto) may recovered from its transform array by applying an inverse transform to the transform array. The invertible joint time-frequency transform is preferably the Gabor transform, but may instead be a wavelet transform, or the Gabor spectrogram.

The operation (c) of generating a modified array of coefficients may comprise (1) determining (i.e. selecting) a subset of coefficient positions (i.e. time-frequency index positions) from the initial array which correspond to a desired subset of one or more order components in the input signal, and (2) setting coefficients of the modified array equal to zero at coefficient positions other than on the determined subset. The coefficients of the modified array at the subset of coefficient positions may be set equal to the corresponding coefficients of the initial array.

The input signal may comprise a plurality of order components. According to one embodiment of the present invention, various order components of the input signal may be selectively extracted (or removed) from the input signal by appropriate selection of the subset of coefficient positions from the initial array of time-frequency coefficients (i.e. the joint time-frequency representation). The inverse joint time-frequency transform may be applied to the modified array of coefficients to produce a time domain signal containing only the selected order components (or the original input signal minus the selected order components).

The subset of order components which the user desires to analyze (i.e. desires to extract from the input signal for presentation to the user) may be selected in a direct or indirect fashion. For example, the user may directly select the desired subset of one or more order components. In this case, the subset of coefficient positions corresponds to this directly-selected subset of order components. Alternatively, the user may select a second subset of one or more order components for removal from the input signal. In this case, the desired subset of order components is the complement of the second subset. The subset of coefficient positions still corresponds to the desired subset of order components. However, the desired subset has been indirectly selected by selecting the second subset of order components for removal.

Various methods may be used to select the order components of interest. For example, the signal analysis system may display a visual representation of the initial array of coefficients, where the various order components are visible in the visual representation as time-frequency order curves. The user may select one or more points in the visual representation to select one or more order components. For example, the user may position a "cross-hairs" on the selected order components (i.e. time-frequency order curves) in the visual representation. The signal analysis system may then determine the one or more time-frequency order curves corresponding to the selected points, where the determined time-frequency order curves correspond to the selected order components. The signal analysis system may select the subset of coefficient positions as those coefficient positions which reside in a union of time-frequency neighborhoods containing the one or more determined time-frequency order curves respectively. Alternatively, where the user (or the system) selects one or more order components for removal from the input signal, the signal analysis system may select the subset of coefficient positions as those coefficient positions which reside in the complement of the union of neighborhoods containing the selected time-frequency order curves.

The size of each neighborhood may be determined automatically or in response to user input. For example, the signal analysis system may automatically determine a size for the time-frequency neighborhood based on an estimate of minimum order distance to nearest neighbor order components.

The signal analysis system may generate the modified array of coefficients from the initial array by performing a masking operation, i.e. by constructing an order mask array, and applying the order mask array to the initial array of coefficients. The signal analysis system may determine one or more time-frequency curves which correspond to the desired subset of order components, and construct the order mask array by setting coefficients of the order mask array equal to one in a union of neighborhoods containing the one or more time-frequency curves respectively, and zero elsewhere.

Alternatively, the signal analysis system may determine a second subset of one or more time-frequency curves which define the complement of the desired subset of order components. The signal analysis system may set coefficients of the order mask array equal to zero in a union of neighborhoods respectively containing the one or more time-frequency curves of the second subset, and equal to one otherwise. Thus, the desired subset of order components (i.e. desired for extraction from the input signal and presentation to the user) comprises order components of the input signal which do not correspond to the second subset of order curves.

In one set of embodiments, the signal analysis system may compute an instantaneous rotation frequency signal which describes the instantaneous rate of change of rotation angle of the rotating apparatus with respect to time. The instantaneous rotation frequency signal defines the fundamental order component (i.e. the order component of order one) of the input signal. The order mask array may be constructed using one or more multiples of the instantaneous rotation frequency signal.

The signal analysis system may receive a rotation indicator signal indicative of rotations of the rotating apparatus, and the instantaneous rotation frequency signal may be computed in response to the rotation indicator signal. Alternatively, the signal analysis system may estimate the instantaneous rotation frequency based on a search of the initial array of transform coefficients or in response to user inputs, thus obviating the necessity of acquiring the rotation indicator signal.

The rotation indicator signal may provide an indication of each rotation of the rotating apparatus. For example, the rotation indicator signal may comprise a series of pulses where each pulse represents a complete rotation of the rotating apparatus. Signal analysis system (or a separate data acquisition device) may preprocess the rotation indicator signal to generate a series of pulse arrival times. Thus, each arrival time corresponds to a rotation of the rotating apparatus. The signal analysis system may filter the arrival times with an FIR filter to determine a stream of first derivative estimates. The coefficients of the FIR filter are determined by at least partially solving a linear system which arises from a Taylor series expansion of time with respect to rotation angle of the rotating apparatus. It may be assumed that the rotating apparatus increases in rotation angle by a fixed amount (e.g. one rotation =360 degrees) between successive arrival times.

The linear system has the form b=Gd, where b is a vector of time differences $t_{k+n}-t_k$ between adjacent arrival times $t_{k+n}$ and a current arrival time $t_k$, where d is a vector of unknown derivatives, i.e. the first through $M^{th}$ derivatives of time with respect to angle at arrival time $t_k$. The coefficients of the linear system, i.e. of matrix G, have the form $$\frac{(n\Delta\theta)^k}{k!},$$

where index k ranges from 1 to the upper limit M, where index k ranges through a set of M distinct integer values different from zero, and $\Delta\theta$ is a constant. In one embodiment, M is even and the set of M distinct integers comprises the non-zero integer values between $-M/2$ and $M/2$ inclusive.

It is noted that the linear system b=Gd need not be solved completely. In one embodiment, only the first derivative term of vector d is solved for by a series of row operations since the solution expression for first derivative term specifies the formula for the FIR filter.

The linear system b=Gd may be solved (or at least partially solved as noted above) in an offline computation. The resulting FIR filter coefficients may be stored in a memory of the signal analysis system. It is noted that a computer device separate from the signal analysis system may solve the linear system, and transfer the resulting coefficients to the signal analysis system.

In response to the stream of first derivative estimates generated by the FIR filter, the signal analysis system may (a) compute an instantaneous rotation frequency signal, and (b) multiply the instantaneous rotation frequency signal by one or more order numbers to determine one or more order curves. The one or more order numbers may be determined by or in response to user input.

The subset of coefficient positions from the initial array may be determined as those positions which reside in a union of time-frequency neighborhoods respectively containing the one or more order curves. Alternatively, the subset of coefficient positions may comprise coefficient positions which correspond to the complement of the union of the time-frequency neighborhoods respectively containing the one or more order curves. As described above, signal analysis system may generate the modified array of coefficients based on the subset of coefficient positions, and generate a time domain signal from the modified array of coefficients. The time domain signal is presented to a user on a presentation device (e.g. an audio speaker and/or display screen).

The signal analysis system may compute the instantaneous rotation frequency signal by: reciprocating the stream of derivative values to generate first rotation frequency values, and interpolating the first rotation frequency values to determine second rotation frequency values at a series of sample times, i.e. the sample times of the input signal.

In one embodiment, the signal analysis system is configured to generate the modified array of coefficients by multiplying the initial array by an arbitrary scaling array. The scaling array may be configured to emphasize and/or de-emphasize order components. The user may determine the scaling properties of the scaling function.

The user may select various different order components for analysis, e.g., in an iterative fashion. Time domain signals generated in response to the selected order components may be visually displayed and/or audially presented to the user. The user may then analyze the different order components to determine information regarding operation of the mechanical system. In response to this analysis, the user may then adjust the mechanical system in various ways. For example, the user or the system may change a design of the mechanical system, the user may replace one or more components of the mechanical system, the user or the system may predict a failure of one or more components of the mechanical system, or the user may add varying amounts of a sound-absorbent material to one or more locations of the mechanical system, etc.

BRIEF DESCRIPTION OF THE DRAWINGS

A better understanding of the present invention can be obtained when the following detailed description of the preferred embodiment is considered in conjunction with the following drawings, in which:

FIG. 7 presents a flowchart for one embodiment of a method for constructing an order mask array in response to a received rotation indicator signal R;

FIG. 10A illustrates a linear system which arises from a Taylor series expansion of time with respect to angle, where the Taylor series is expanded up through the fourth derivative, where two previous arrival times and two succeeding arrival times have been substituted for the time variable;

FIG. 10B illustrates the inverse matrix H which corresponds to the 4×4 coefficient matrix of FIG. 10A;

FIG. 10C illustrates a 2×2 reduced linear system which arises from the system of FIG. 10A by selected row operations and elimination of variables;

Figure 1A:
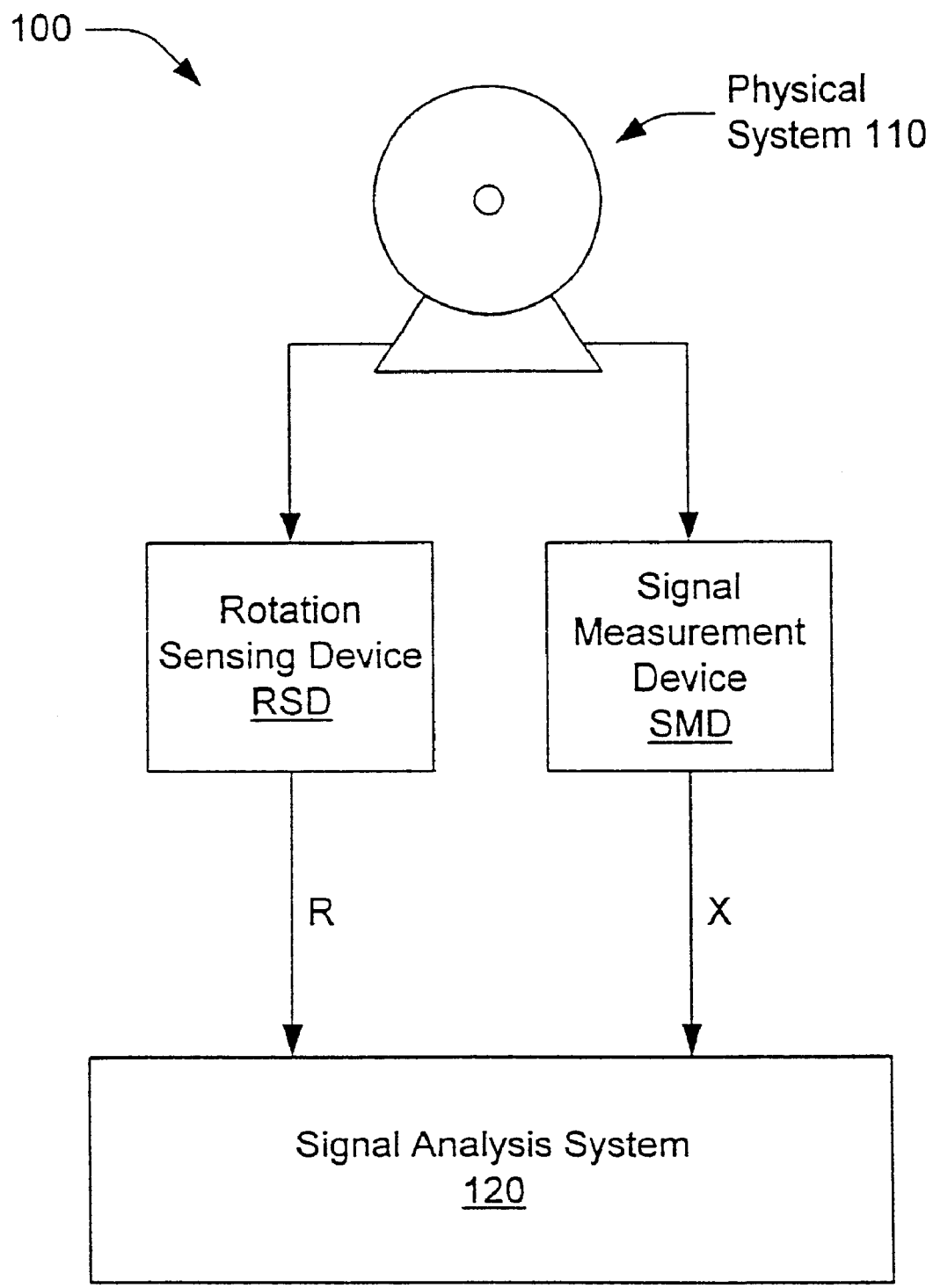
FIG. 1A illustrates a system configuration 100 for analyzing physical signals acquired from a mechanical system comprising one or more rotating elements.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Pat. No. 5,353,233 titled "Method and Apparatus for Time Varying Spectrum Analysis" whose inventors are Shie Qian and Dapang Chen, which was issued on Oct. 4, 1994, is hereby incorporated by reference in its entirety as though fully and completely set forth herein.

U.S. Pat. No. 5,852,567 titled "Iterative Time-Frequency Domain Transform Method for Filtering Time-Varying, Nonstationary Wide Band Signals in Noise", whose inventors are Xiang-Gen Xia and Shie Qian, which was issued on Dec. 22, 1998, is hereby incorporated by reference in its entirety as though fully and completely set forth herein.

U.S. patent application Ser. No. 09/551,924, U.S. Pat. No. 6,332,116, titled "System and Method for Analyzing Signals of Rotating Machines" whose inventors are Shie Qian and Hui Shao, which was filed on Apr. 19, 2000, is hereby incorporated by reference in its entirety as though fully and completely set forth herein.

U.S. patent application Ser. No. 09/636,097, U.S. Pat. No. pending, titled "System and Method for Analyzing Signals Generated by Rotating Machines" whose inventors are Shie Qian, Hui Shao and Wei Jin, which was filed on Aug. 10, 2000, is hereby incorporated by reference in its entirety as though fully and completely set forth herein.

Joint Time-Frequency Analysis—Methods and Applications by Shie Qian and Dapang Chen, published by Prentice-Hall, ISBN 0-13-254384-2, is hereby incorporated by reference in its entirety as though fully and completely set forth herein.

FIG. 1A

FIG. 1A illustrates a system configuration 100 for performing signal analysis. System configuration 100 may comprise a physical system 110 to be analyzed, a rotation sensing device RSD, a signal measurement device SMD and a signal analysis system 120 which may also be referred to as a measurement system. Physical system 110 may be a mechanical system which contains one or more rotating elements. For example, physical system 110 may be an automobile engine, an aircraft engine, a turbine, a disk drive, a tape drive, a fan motor, a boat propeller, or any other machine or device having a rotating element.

Signal measurement device SMD is preferably placed proximate to (e.g., on or close to) the physical system 110. Signal measurement device SMD may measure a physical signal generated by physical system 110 and transduce the physical signal into a corresponding electrical signal X. Signal measurement device SMD may present the electrical signal X to signal analysis system 120 in analog and/or digital form. Thus, in one embodiment, signal measurement device SMD includes analog-to-digital conversion hardware. In a second embodiment, digital-to-analog conversion hardware is comprised within signal analysis system 120.

Signal measurement device SMD may comprise any of a variety of measurement devices such as a microphone, an accelerometer, a spatial displacement sensor, a strain gauge, a pressure sensor, a temperature sensor (e.g., a thermocouple), a radiation sensor, an optical sensor, etc. In one embodiment, signal measurement device SMD may represent an array of transducers or measurement devices of one or more types. For example, an array of microphones may be distributed at various locations in an engine to acquire audio signals from the engine.

Rotation sensing device RSD may detect rotations of a rotating element in the physical system 100, and may present a rotation indicator signal R to signal analysis system 120. Thus, rotation sensing device RSD may generate the rotation indicator signal R which is indicative of rotations of the rotating element in physical system 110. In one embodiment, rotation sensing device RSD may comprise a tachometer which generates an electrical pulse for each rotation of the rotating element. Rotation sensing device RSD may present the rotation indicator signal R to signal analysis system 120 in analog or digitized form.

Figure 2A:
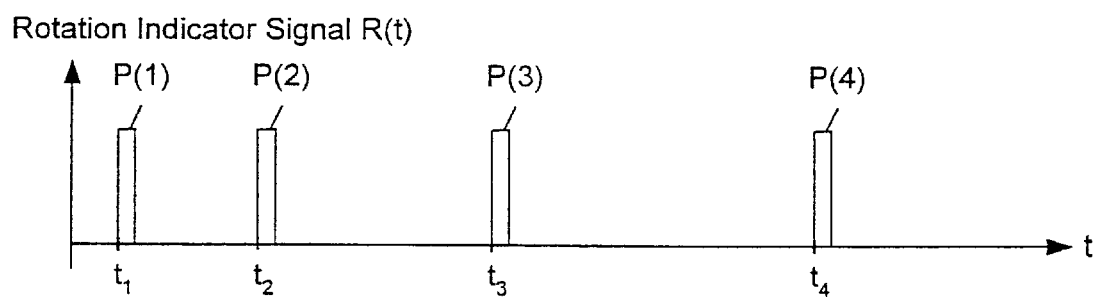
FIGS. 2A and 2B illustrate signals generated by typical tachometers.
Figure 2B:
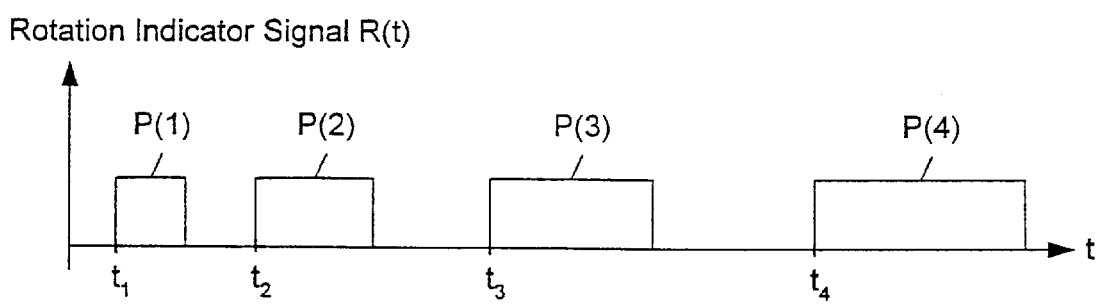
Figure 2C:
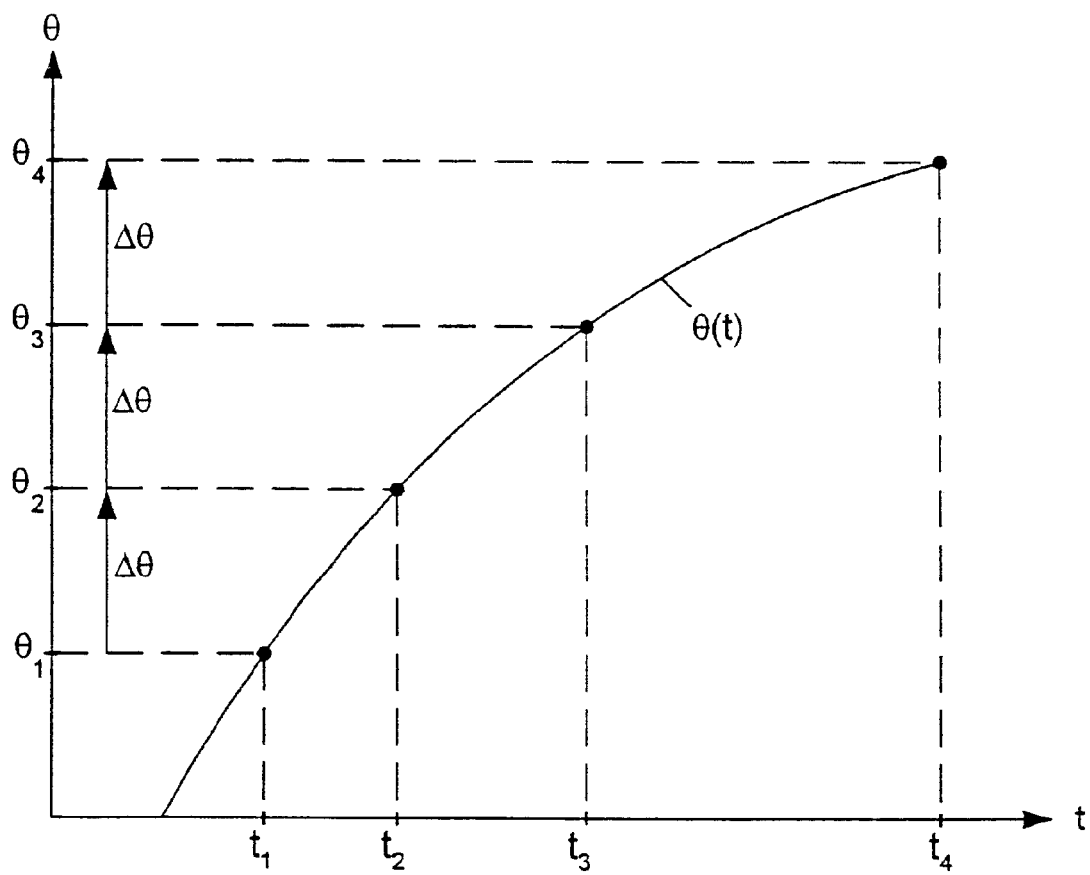
FIG. 2C illustrates cumulative rotation angle of a rotating apparatus as a function of time.

FIG. 2A presents one example of a tachometer signal. The tachometer signal comprises a series of pulses P(k) which occur at times $t_k$ respectively. The time between successive pulses P(k) and P(k+1) of the tachometer signal corresponds to one rotation of the rotating element. FIG. 2B presents a second example of a tachometer signal. FIG. 2C illustrates cumulative rotation angle $\theta$ of the rotating element as a function of time t. The times of arrival $t_k$ of the pulses P(k) in the tachometer signal correspond to samples of the cumulative rotation angle function $\theta(t)$. The cumulative rotation angle function increases by a fixed angle $\Delta\theta$ in the time interval between times $t_k$ and $t_{k+1}$. In one embodiment, $\Delta\theta=2\pi$ radians (or corresponds to 1 revolution in any system of angular measurement).

Figure 1B:
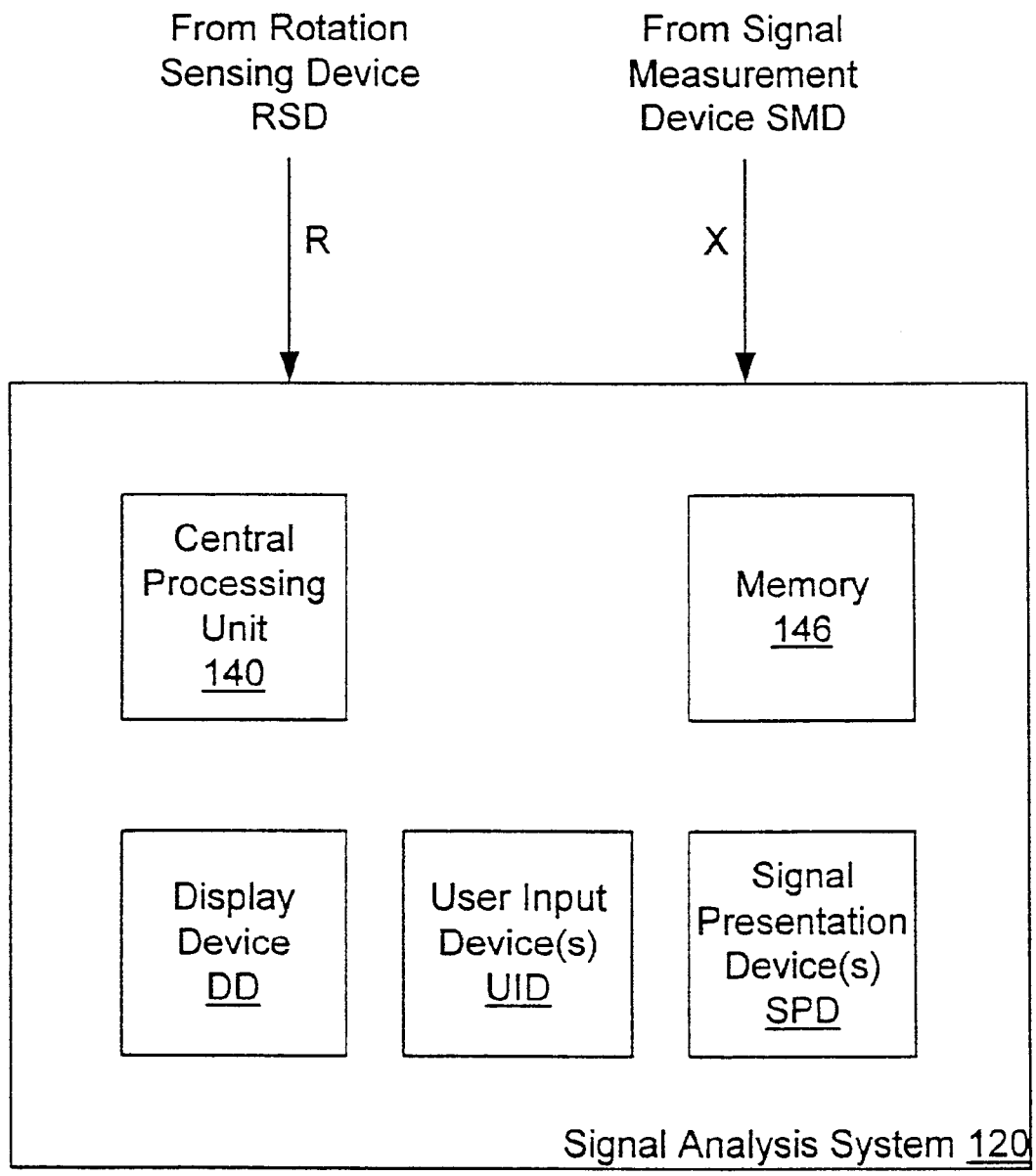
FIG. 1B illustrate one embodiment for a signal analysis system 120.

Signal analysis system 120 may couple to signal measurement device SMD and rotation sensing device RSD. Signal analysis system 120 may be configured for analyzing one or more order components of a signal generated by or acquired from physical system 110. Signal analysis system 120 may comprise a processor or central processing unit 140, memory 146, signal presentation device(s) SPD, user input device(s) UID and a display device DD as shown in FIG. 1B. CPU 140 may be realized by any of a variety of computational devices such as a general purpose processor, a digital signal processor, a parallel processor, dedicated digital and/or analog circuitry, programmable gate array logic (e.g., an FPGA), etc., or any combination thereof. Memory 146 may comprise any of a variety of memory devices such as random access memory (RAM) and/or read-only memory (ROM), as described further below. Signal analysis system 120 may also include specialized data acquisition and/or signal conditioning hardware, interface hardware, etc., or any combination thereof.

Signal analysis system 120 may comprise any of various devices, such as a programmable computer system, a computer-based system such as a VXI-based system, a PXI-based system, a GPIB-based system, a computer-based data acquisition system, or a dedicated test instrument, such as a dynamic signal analyzer, an oscilloscope or any other signal acquisition and/or analysis device.

Signal analysis system 120 may operate on samples of the electrical signal X generated by signal measurement device SMD and on the rotation indicator signal R, optionally in response to user input(s) provided through user input device (s) UID, and generate an output signal Y. The output signal Y (or a representation thereof) may be presented to the user through signal presentation device(s) SPD.

Signal presentation device(s) SPD may comprise one or more speakers, a display screen (which may be identical to or distinct from display device DD), a projector, a tactile output device, a virtual reality headset, etc., or other types of output devices, or any combination thereof. In one embodiment, signal analysis system 120 may present the output signal Y to a speaker, and a graphical depiction of the output signal Y to the display screen. The acoustic or audial presentation (through the speaker) may be especially meaningful in situations where the original physical signal measured by signal measuring device SMD is an acoustic signal, e.g., engine noise.

User input device(s) UID may comprise a keyboard, a pointing device such as a mouse or trackball, a touch pad (such as those used in modern laptop computers for cursor control), a touch sensitive display screen, etc., or other input devices. In one embodiment, user input device(s) UID may include use of a graphical control panel configured with various control icons such as buttons, knobs, sliders, switches, indicators, etc., or any combination thereof. A user provides input to signal analysis system 120 through user input device(s). Signal analysis system 120 may manage a graphical user interface through display device DD and user input device(s) UID.

Figure 3A:
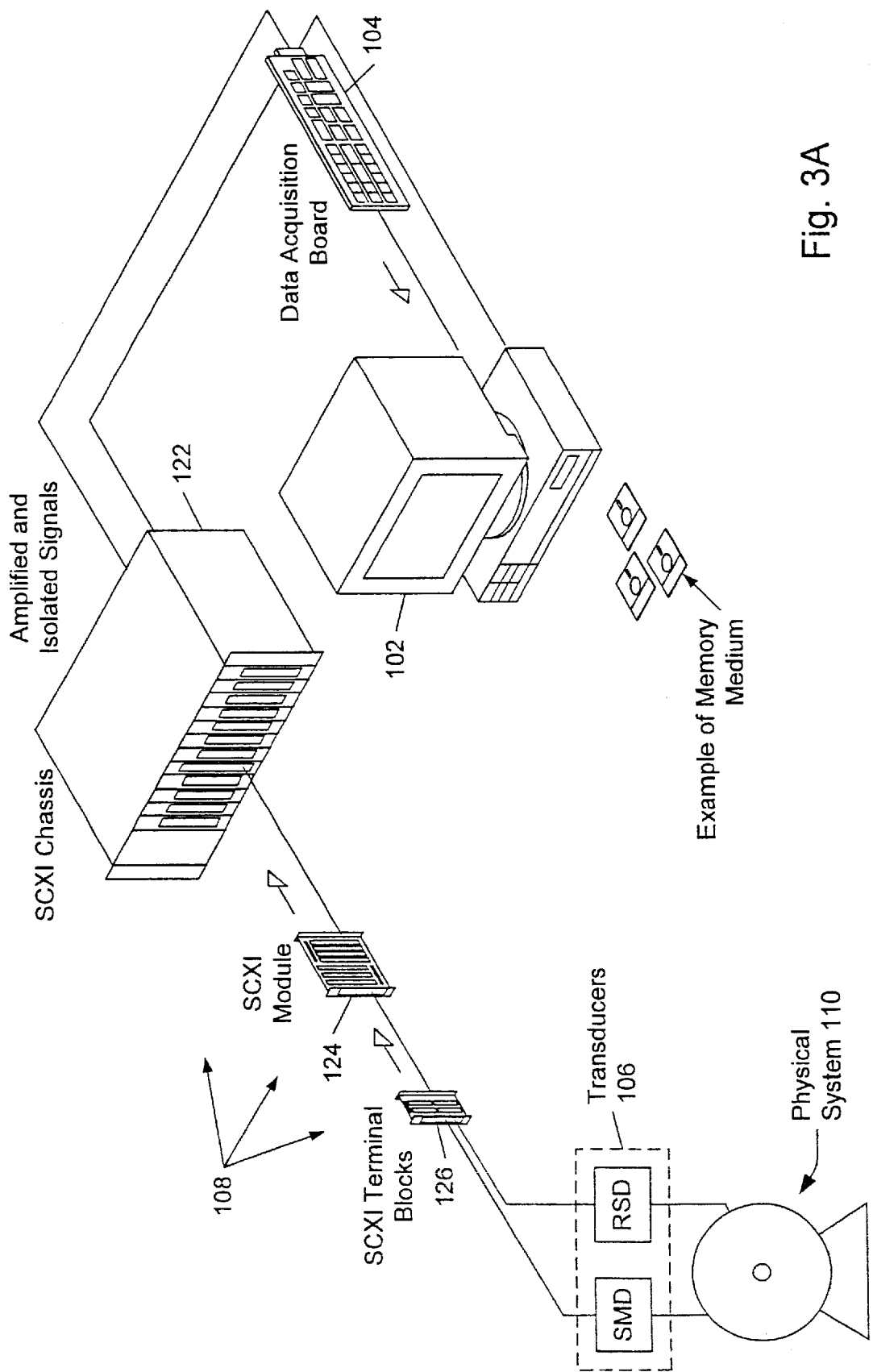
FIG. 3A illustrates one embodiment of signal analysis system 120 comprising a computer-based measurement system, where signals generated by signal measurement device SMD and rotation sensing device RSD are presented to computer 102 through signal conditioning system 108 and data acquisition (DAQ) device 104.
Figure 3B:
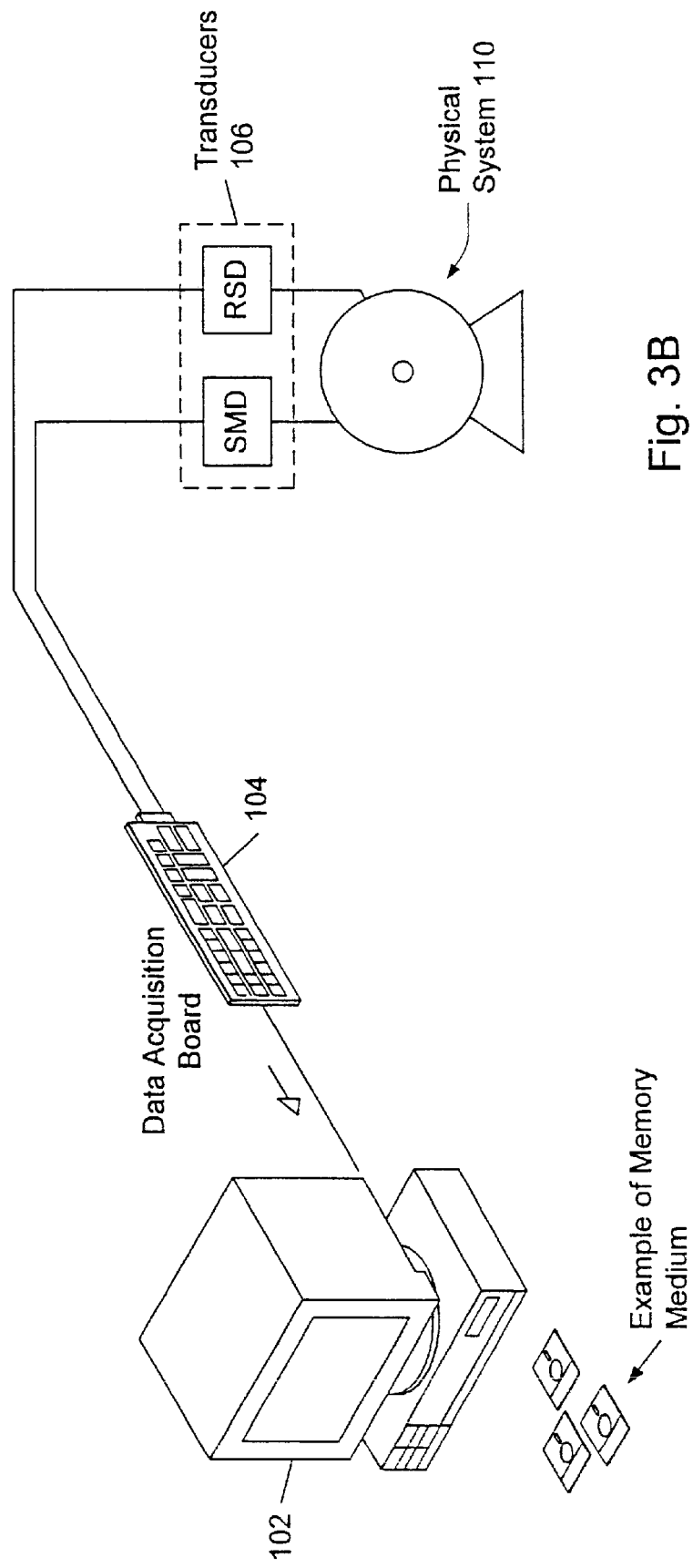
FIG. 3B illustrates a second embodiment of signal analysis system 120 comprising a computer-based measurement system, where signals generated by signal measurement device SMD and rotation sensing device RSD are presented to computer system 102 through data acquisition (DAQ) device 104.

FIGS. 3A and 3B

FIGS. 3A and 3B illustrate exemplary embodiments of signal analysis system 120. As shown, signal analysis system 120 may comprise a computer 102, a data acquisition (DAQ) device 104 coupled to the computer 102, and optionally a signal conditioning system 108 coupled to the DAQ device 104. Signal measurement device SMD and rotation sensing device RSD may comprise transducers 106 that couple to DAQ device 104 through the signal conditioning circuitry 108. As shown, the transducers 106, e.g., signal measurement device SMD and rotation sensing device RSD, may couple to physical system 110 to acquire signals from physical system 110.

As shown, the transducers SMD and RSD are coupled to acquire signals from the physical system 110. The signals X and R generated by the transducers SMD and RSD respectively may be optionally conditioned by the signal conditioning system 108 as shown in FIG. 3A. The conditioned signals may then be provided to DAQ device 104 as shown. Signal conditioning system 108 may connect to DAQ device 104 via one or more cables.

Signal conditioning system 108 may comprise an external chassis 122 housing one or more signal conditioning modules 124 and optionally terminal blocks 126. Signal conditioning system 108 may be used to perform signal conditioning on field signals such as the signals generated by rotation sensing device RSD and signal measurement device SMD. As used herein, the term "signal conditioning" may include one or more of amplifying, linearizing, limiting, isolating, filtering, switching and/or multiplexing field signals (e.g. transducer excitation), among other signal processing functions. Signal conditioning system 108 may advantageously reduce the introduction of noise into the signals transmitted to DAQ device 104. DAQ device 104 may receive conditioned field signal from signal conditioning system 108 as shown in FIG. 3A. Alternatively, DAQ device 104 may directly receive the field signals from transducers 106, e.g., signal measurement device SMD and rotation sensing device RSD. DAQ device 104 operates to perform analog to digital (A/D) conversion and provides the resultant digital signals to computer 102 for processing.

Computer system 102 may include various standard components, including a processor or central processing unit (CPU) 140, system memory 146, non-volatile memory, one or more buses, and a power supply. DAQ device 104 may be a specialized system for acquiring digital and/or analog signals from external devices. Thus, DAQ device 104 may include analog to digital (A/D) conversion circuitry and/or digital to analog (D/A) conversion circuitry. Examples of the DAQ device 104 include "E series" DAQ boards from National Instruments Corporation. DAQ device 104 may also comprise a computer-based instrument board, such as an oscilloscope, a digital multimeter (DMM), a dynamic signal analyzer, an arbitrary waveform generator, etc. DAQ device 104 may comprise hardware for detecting and storing the times of arrival of tachometer pulses.

In one embodiment, computer 102 may comprise input/output (I/O) slots into which DAQ device 104 may be coupled. In another embodiment, computer 102 may comprise a VXI (VME Extensions for Instrumentation) chassis and bus, a GPIB (General Purpose Interface Bus) interface card, a serial port or parallel port by which DAQ device 104 may be coupled to the computer 102.

Signal analysis system 120, e.g., computer system 102, preferably includes at least one memory medium on which computer programs according to the present invention may be stored. The term "memory medium" is intended to include various types of memory or storage, including an installation medium, e.g., a CD-ROM, or floppy disks 104, a computer system memory or random access memory such as DRAM, SRAM, EDO RAM, Rambus RAM, EPROM, EEPROM etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system, dedicated test or measurement instrument or other device. In general, the term "computer system" can be broadly defined to encompass any system having a processor which executes instructions from a memory medium.

The memory medium preferably stores a software program for analyzing signals acquired from a rotating machine. More particularly, the software program may be operable to analyze signals acquired or sampled at uniform time intervals and generate order data or order information useful in analyzing the operation of physical system 110.

The software program may be implemented in any of various ways, including procedure-based techniques, component-based techniques, object-oriented techniques, or neural net based learning techniques, among others. For example, the software program may be implemented using ActiveX controls, C++ objects, Java objects, Microsoft Foundation Classes (MFC), or other technologies or methodologies, as desired. A CPU, such as the host CPU, executing code and data from the memory medium comprises a means for performing signal analysis on signals acquired from a rotating machine according to the methods or flowcharts described below.

Various embodiments further include receiving, storing, and/or transmitting instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Figure 4:
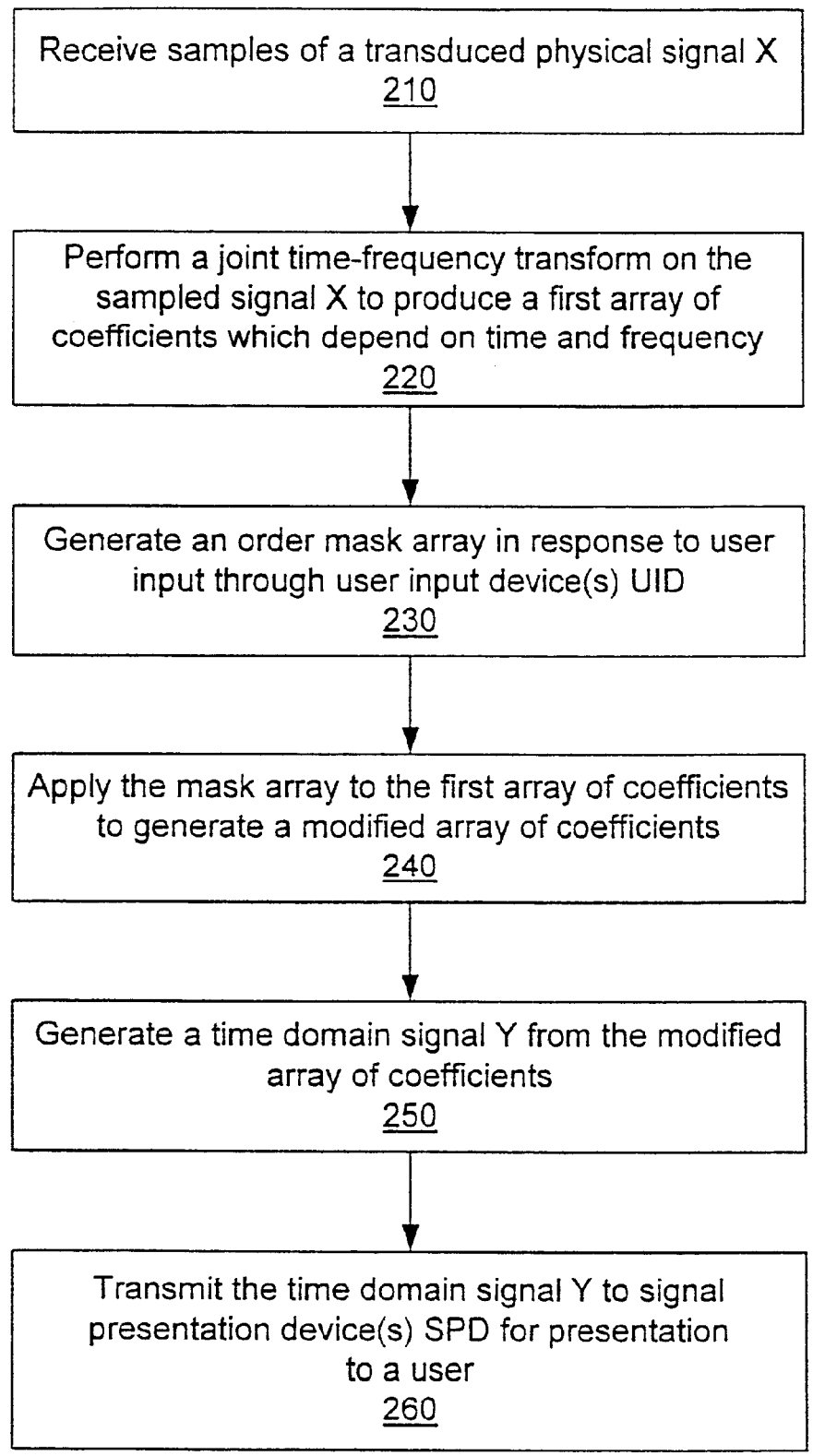
FIG. 4 presents a flowchart for one embodiment of an order analysis method.

FIG. 4—Flowchart Diagram

FIG. 4 illustrates one embodiment of a method for analyzing order components present in the physical signal X acquired from physical system 110. For example, the method of FIG. 4 may be implemented by execution of the computer programs stored on the memory medium as described above.

In step 210, signal analysis system 120 receives samples of the transduced physical signal X. These samples are preferably generated with a fixed time interval between successive samples. In other words, the samples may be equally space in time. (The signal measurement device SMD may acquire signals from the physical system 110 and provide digitized samples of these signals to the signal analysis system 120.)

In step 220, signal analysis system 120 may perform an invertible joint time-frequency transform on the sampled signal X to produce a first array (i.e. an initial array) of transform coefficients which depend on time and frequency. The joint time-frequency transform is preferably invertible, meaning that an arbitrary input signal may be recovered (or recovered up to numerical computation error) from its array of transform coefficients by applying a corresponding inverse transform to the transform array.

In the method described herein, one or more order components may be selected for analysis from the joint time-frequency representation (i.e. the first array of coefficients). After selection of the one or more order components for analysis, the coefficients corresponding to these selected order components (not including coefficients corresponding to the non-selected order components) may be converted back into a time domain signal. This resulting time domain signal thus contains information only on the selected order components, thus providing information on these order components in the input signal.

In one embodiment, the joint time-frequency transform is the Gabor transform. For more information on the Gabor transform, see Qian and Chen, Joint Time-Frequency Analysis, referenced above. Other joint time-frequency transforms are also contemplated. one alternative embodiment, the joint-time frequency transform may be a wavelet transform. In another embodiment, the joint-time frequency transform may be the Gabor spectrogram which is described in U.S. Pat. No. 5,353,233, incorporated by reference above. This embodiment using the Gabor spectrogram may be less preferred, since the Gabor spectrogram is not completely invertible.

Figure 5:
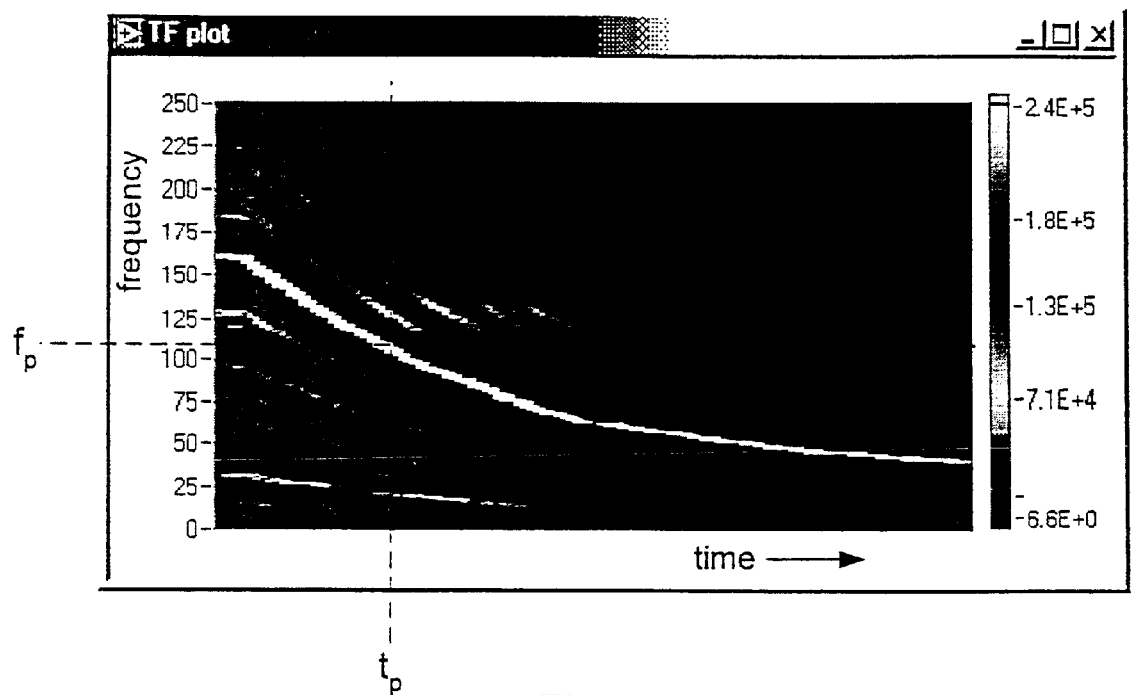
FIG. 5 illustrates a time-frequency transform magnitude plot, i.e., a plot of the magnitude of a joint time-frequency transform for a particular input signal.

FIG. 5 illustrates a magnitude plot of the first array of coefficients generated by a Gabor transform of the original signal X. The horizontal axis denotes time. The vertical axis denotes frequency. Thus, plots such as FIG. 5 are referred to as TF plots (i.e., time-frequency plots). The magnitude of the coefficients comprising the first array are denoted by gray scale with full white indicating a maximal magnitude and full black indicating a minimal magnitude (e.g. zero magnitude). It is noted that gray scale may not map to coefficient magnitude in a linear fashion. Non-linear mapping may be more advantageous in certain situations.

Observe that the TF transform magnitude plot of FIG. 5 exhibits a series of curves which are shaped roughly like decaying exponentials. The coefficient magnitudes along a given curve may be larger than magnitudes off the curve (at least in a local neighborhood of the curve). These curves are referred to herein as order curves. An order curve corresponds to a component of the physical signal X which is periodic with respect to rotation angle of the rotating element. For example, in an automobile engine with 6 cylinders, all six cylinders may fire for each rotation of a crank shaft. Thus, one would expect to see a large magnitude curve for order 6. The order curves of FIG. 5 are shaped like decaying exponentials because the underlying rotating element is decreasing in angular velocity. Thus, as time proceeds, the frequency associated with any given order curve decreases. If the rotating element were increasing in angular velocity, the order curves would increase in frequency as a function of time.

In steps 230 and 240, signal analysis system 120 generates a modified array (i.e. a second array) of coefficients from the first array of coefficients. Signal analysis system may generate the modified array of coefficients by selecting a subset of coefficient positions (i.e. time-frequency index positions) from the first array, setting coefficients of the modified array equal to zero outside the subset and equal to the corresponding coefficients of the first array on the subset. In step 230, signal analysis system 120 determines the subset of coefficient positions. In step 240, signal analysis system 120 uses the subset of coefficient positions to generate the modified array of coefficients from the first array.

In one embodiment, the subset of coefficient positions may be selected in response to user input. In another embodiment, the subset of coefficient positions may be selected automatically, i.e., programmatically selected, based on pre-programmed or user-selected identification criteria. The subset of coefficient positions may correspond to order components of interest to the user, i.e., order components desired to be analyzed by the user.

In one embodiment of step 230, signal analysis system 120 may generate an order mask array which is used to determine the modified array of coefficients from the first array. The order mask array may be generated in response to user input through user input device(s) UID, or may be generated automatically by software executing in the signal analysis system 120. The order mask array may comprise an array of coefficients similar in structure to the first array generated by the joint time-frequency transform. Coefficients of the order mask array may take the values one or zero, in order to select a subset of coefficients and mask out other coefficients from the first array. Thus the "1" values in the order mask array select the subset of desired coefficients, while the "0" values mask out other non-desired coefficients. The desired coefficients correspond to the subset of coefficient positions alluded to above.

The user may select the desired order components in various ways. In one embodiment, signal analysis system 120 may present a TF transform magnitude plot of the first array (such as the plot of FIG. 5) to the user through display device DD. Thus, the user may be able to visually identify which orders have largest magnitude, smallest magnitude, etc. The user may provide an indication of one or more order curves which he/she desires to extract from the ambient signal X through user input device(s) UID. For example, the graphical user interface managed by signal analysis system 120 may provide adjustable cross hairs for the user to indicate particular positions within the displayed TF transform magnitude plot, as shown in FIG. 5. The user may drag vertical and horizontal cross hairs with a pointing device (such as a mouse) until the cross hairs intersect at a point on a desired order curve. In addition (or alternatively), the user may move a screen cursor with a pointing device (such as a mouse, trackball, etc.) until the cursor lies on a point of the desired order curve. In response to a user selection event (e.g. clicking on a mouse button), signal analysis system 120 may receive horizontal and vertical coordinates of the selected point on the desired order curve. Signal analysis system 120 may compute an order number from the coordinates of the selected point. More details on the order number computation are provided below. In some embodiments, the user may be able to enter an order number (e.g. on a numeric keypad) to select a desired order curve. The order number is typically measured in cycles per rotation. The order having order number one, i.e. one cycle per rotation, is referred to herein as the fundamental order.

Figure 6:
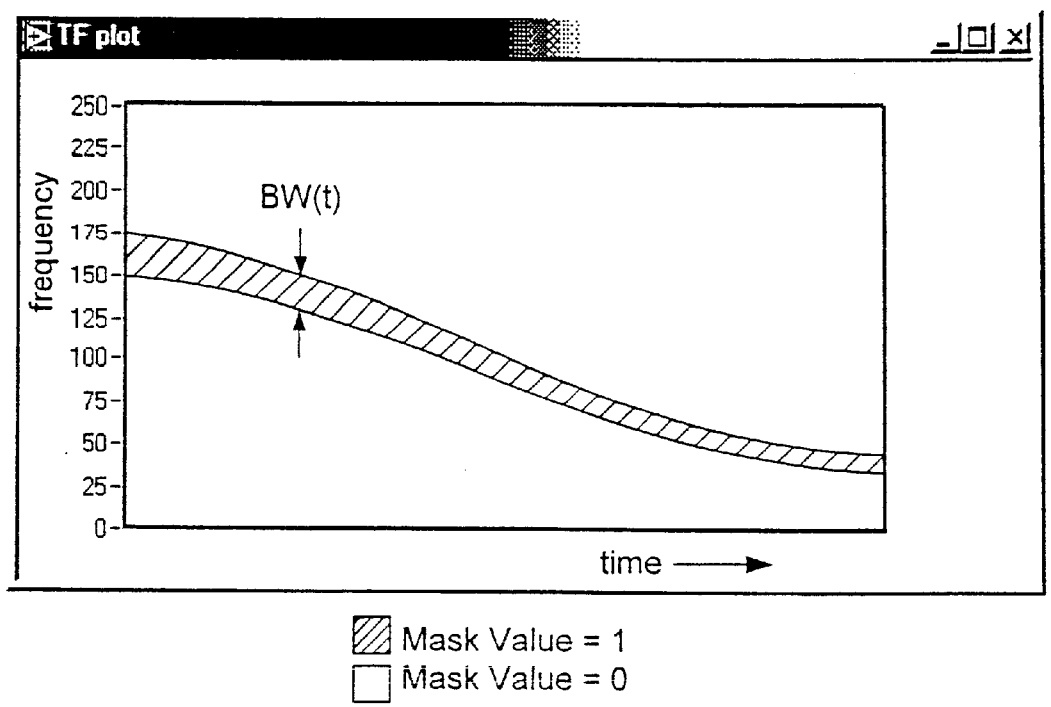
FIG. 6 illustrates the structure of an order mask array configured to retain only one order component of the input signal.

The user may specify at least one point on each order curve he/she desires to analyze. Signal analysis system 120 may generate the mask array so that coefficients in a time-frequency neighborhood of the desired order curve(s) are set to one, and coefficients outside the neighborhood may be set to zero, as suggested by FIG. 6. Signal analysis system 120 may allow the user to adjust properties of the time-frequency neighborhood. For example, the user may be able to control the frequency bandwidth of the time-frequency neighborhood around the desired order curve(s). In one embodiment, signal analysis system 120 may superimpose the boundary of the time-frequency neighborhood on a TF transform magnitude plot displayed to the user through display device DD. Thus, the user may visually observe the time-frequency neighborhood in relation to the desired order curve(s). The frequency bandwidth BW(t) of the neighborhood as a function of time may vary with respect to time. The user may provide inputs which control the frequency bandwidth function BW(t). For example, the user may provide a bandwidth control parameter to signal analysis system 120 through user input device(s) UID. Signal analysis system 120 determines the frequency bandwidth function BW(t) in response to the bandwidth control parameter.

In one embodiment of step 240, signal analysis system 120 may apply the mask array to the first array of coefficients to generate the modified array (i.e. the second array) of coefficients. For example, signal analysis system 120 may multiply the mask array by the first array to generate the modified array of coefficients. Coefficients of the modified array may be equal to corresponding coefficients of the first array in the time-frequency neighborhood of the desired order curve(s), and may equal zero otherwise. Thus, the mask array may serve to pick out a particular subset of coefficients from the first array which are desired to be analyzed and to suppress (i.e., to set to zero) the coefficients outside the particular subset. The act of suppressing coefficients is also referred to herein as "removing" or "eliminating" the coefficients.

In some embodiments, signal analysis system 120 may generate each coefficient of the modified array by conditionally transferring the corresponding coefficient of the first array of transform coefficients in response to logically testing the corresponding value of the mask array. In other words, a processor (or dedicated circuitry) within signal analysis system 120 may perform operations as indicated by the following pseudo code:

If (Mask(I,J)=1) ModifiedArrayCoeff(I,J)=FirstArrayCoeff(I,J)

Else ModifiedArrayCoeff(I,J)=0.

The indices I and J parameterize the coefficients of the first array, mask array and modified array.

In step 250, signal analysis system 120 may generate (i.e., compute) a time domain signal Y from the modified array of coefficients, i.e., from the subset of coefficients remaining after the masking operation. Signal analysis system 120 may generate the time domain signal Y by performing an inverse joint time-frequency transform on the modified array of coefficients. The inverse joint time-frequency transform may be the inverse of the forward transform applied in step 220. For example, the inverse transform may be the inverse Gabor transform. In an alternate embodiment, where the wavelet transform was used in step 220, the inverse transform may be an inverse wavelet transform.

The time-domain signal Y may represent the behavior in time of the desired order(s) selected by the user. In step 260, signal analysis system 120 transmits the time domain signal Y to signal presentation device(s) SPD for presentation to a user. As described above, signal presentation device(s) SPD may comprise at least one speaker. Thus, signal analysis system 120 may transmit samples of the time domain signal Y to a digital-to-analog converter (DAC). The DAC converts the time domain signal Y into a continuous-time (i.e. analog) signal, and transmits the continuous-time signal to the speaker. The user may listen to the acoustic signal generated by the speaker in response to the continuous-time signal. In addition, signal presentation device(s) SPD may include a visual display (e.g. display device DD, a projection screen, etc.). Thus, signal analysis system 120 may transmit a graphical representation of the time domain signal Y to the visual display. Thus, the user may be able to visually observe the time domain signal Y as well as listen to the acoustic representation of time domain signal Y.

Steps 230, 240 and 250 have been described above in terms of a user directly indicating one or more order components (e.g. by designating points on the corresponding order curves in a TF magnitude plot) to be extracted from the input signal for presentation to the user. The extraction is accomplished by modifying coefficients in the time-frequency domain, and then, inverse transforming the modified coefficients. The coefficient modification may be accomplished by applying an order mask to the first array, i.e. the transform of the input signal. The order mask is set to one in neighborhoods containing the one or more selected order components respectively, and set to zero outside these neighborhoods.

In addition, signal analysis system 120 may support indirect selection of the one or more desired order components to be extracted (i.e. analyzed). In the indirect selection mode, the user may specify one or more order components to be suppressed (i.e. removed) from the input signal. For example, the user may manipulate the graphical user interface to designate a point on each of the order component curves (from the TF magnitude plot) which are to be suppressed. Signal analysis system 120 sets the order mask coefficients equal to zero in neighborhoods of the designated order component curves, and equal to one outside these neighborhoods. Thus, the output signal Y represents the input signal minus the one or more suppressed order components. The desired order components (i.e. those desired for extraction and analysis) are indirectly selected for extraction by directly selecting the non-desired order components for suppression.

In one embodiment of signal analysis system 120, the user may toggle between a direct order selection mode and an indirect order selection mode. In the direct order selection mode, order components selected by the user are the desired order components to be analyzed, and the non-selected order components are masked or removed prior to performing the inverse transform in step 250 to generate the time domain signal Y. In the indirect order selection mode, order components physically selected by the user are masked or removed, thus effectively "selecting" the remaining order components for analysis. Thus, order components may be "selected" either by direct user selection of the desired subset of components, or order components may be "selected" by the user selecting non-desired order components for suppression (i.e. removal).

In some embodiments, signal analysis system 120 may automatically (e.g., programmatically) select one or more order curves for analysis or suppression. Signal analysis system 120 may operate on the first array of coefficients, and automatically detect the fundamental order curve. The fundamental order curve may be detected based on its low frequency and large magnitude. Furthermore, signal analysis system 120 may detect one or more order curves having certain pre-programmed or user-defined properties such as largest magnitude, smallest magnitude, etc. Signal analysis system 120 may extract the one or more order curves from the input signal, and present the one or more order curves to the user through signal presentation device(s) SPD. Alternatively, signal analysis system 120 may subtract (i.e. suppress) the detected one or more order curves from the input signal, and present the remainder signal to the user through signal presentation device(s) SPD. It is noted that the extraction or suppression of order components occurs in the time-frequency transform domain. However, the net result as perceived by the user is that order components have been extracted or suppressed from the input signal.

FIG. 7—Construction of the Order Mask Array

As discussed above, in step 230 of the method of FIG. 4, signal analysis system 120 may generate an order mask array in response to user input through user input device(s) UID. In one embodiment, signal analysis system 120 constructs the order mask array as indicated by the flowchart of FIG. 7.

In step 310, signal analysis system 120 may compute an instantaneous rotation frequency signal $F_1(t)$ with respect to time. The instantaneous rotation frequency signal (also referred to herein as the fundamental order curve) may be computed in response to the rotation indicator signal R. In one set of alternative embodiments, the instantaneous frequency signal may be computed directly from the first array of transform coefficients without using the rotation indicator signal R. In another set of alternative embodiments, the instantaneous frequency signal may be determined by user input, e.g., by user specification of multiple points along the instantaneous rotation frequency signal (i.e. the fundamental order curve) in a TF magnitude plot. In one embodiment, a combination of the above methods may be employed to determine the instantaneous rotation frequency signal.

In step 320, signal analysis system 120 may multiply the instantaneous rotation frequency signal $F_1(t)$ by one or more order numbers $C_1, C_2, \ldots, C_N$ to generate instantaneous order frequency curves $F_{C1}(t)=C_1*F_1(t)$, $F_{C2}(t)=C_2*F_1(t)$,

. . . , $F_{CN}(t)=C_N*F_1(t)$, corresponding to orders $C_1, C_2, \ldots, C_N$ respectively. The order numbers $C_1, C_2, \ldots, C_N$ may be determined by user input.

Figure 8A:
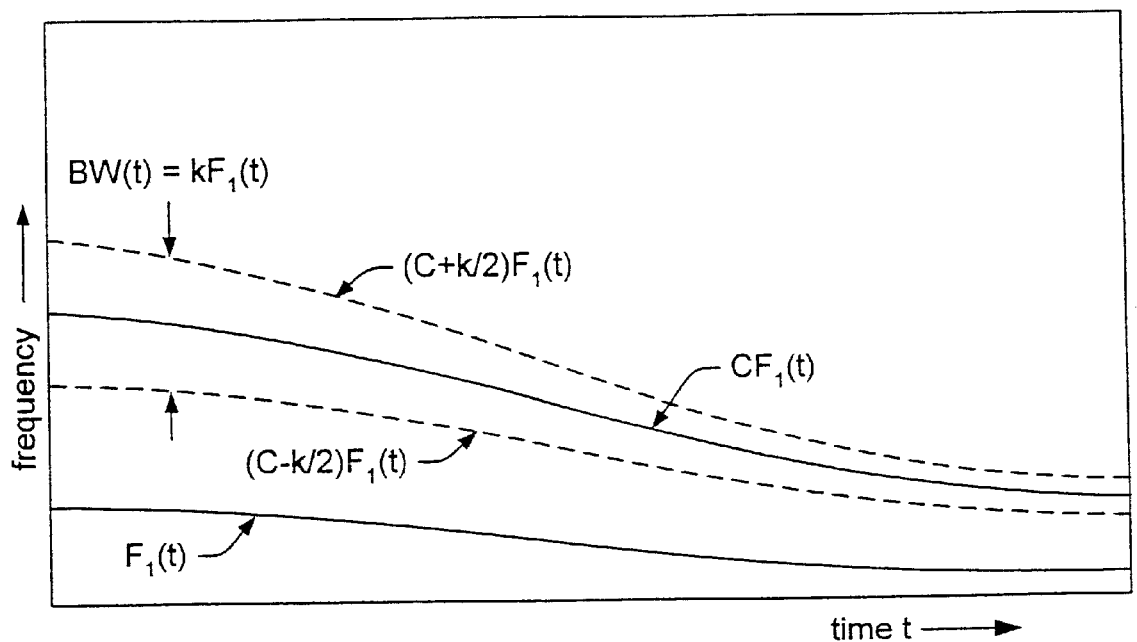
FIG. 8A illustrates one possible realization for a time-frequency neighborhood containing a time-frequency curve corresponding to order number C used in the generation of the order mask array.

In step 330, signal analysis system 120 may construct the order mask array by setting coefficients Coeff(t,f) of the order mask array equal to one [zero] in a time-frequency neighborhood of each of the order frequency curves $F_{C1}(t)$, $F_{C2}(t)$, . . . , $F_{CN}(t)$, and zero [one] outside the time-frequency neighborhoods. For example, a time-frequency neighborhood for an order frequency curve of order C may be defined as the time-frequency region between the curves $(C+k/2)*F_1(t)$ and $(C-k/2)*F_1(t)$ as shown in FIG. 8A. While the frequency bandwidth $BW(t)=k*F_1(t)$ varies in time, the order bandwidth k is constant. In some embodiments, the order bandwidth may vary with respect to time, i.e. k=k(t). In one embodiment, the order bandwidth for each order curve neighborhood may be defined by user input.

Signal analysis system 120 may receive a stream of digital values representing the times of arrival $t_k$ of successive pulses P(k) in the rotation indicator signal R (e.g. a tachometer signal) as suggested by FIGS. 2A and 2B. Data acquisition device 104 may comprise circuitry for measuring the arrival times of pulses in the rotation indicator signal R.

Figure 8B:
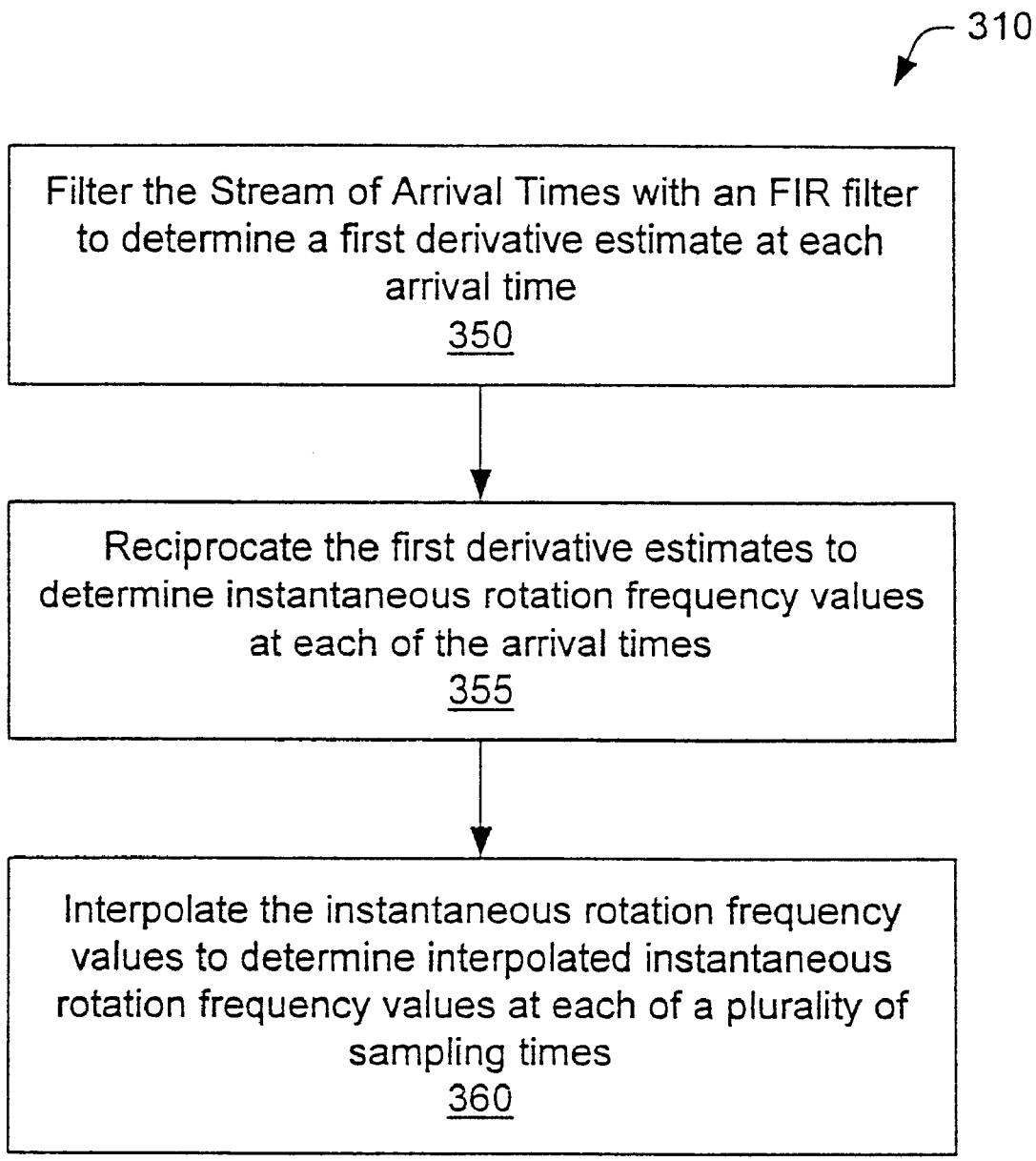
FIG. 8B illustrates one embodiment of a method for computing an instantaneous rotation frequency signal in response to a stream of arrival times provided by a rotation indicator signal R.
Figure 8C:
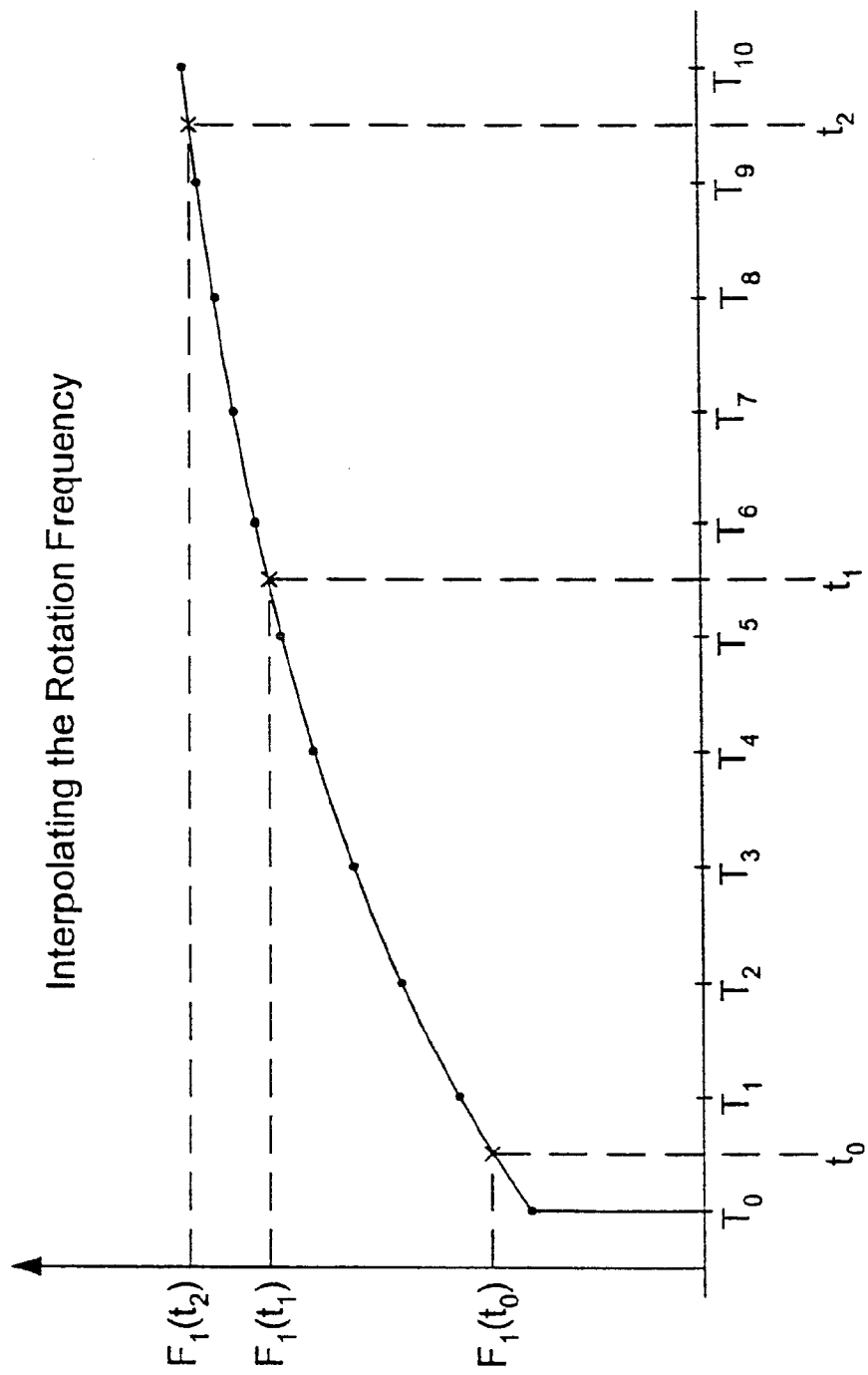
FIG. 8C illustrates an interpolation which determines instantaneous rotation frequency values for sample times $T_J$ based on the instantaneous rotation frequency values at arrival times $t_k$ of pulses in the rotation indicator signal R (e.g. a tachometer signal)

FIG. 8B—Computing the Instantaneous Rotation Frequency

FIG. 8B illustrates one embodiment of step 310, i.e. the step of computing the instantaneous rotation frequency signal $F_1(t)$. In step 350, signal analysis system 120 estimates a first derivative $t'_k$ at each arrival time $t_k$ by filtering the adjacent arrival times $t_{k+n}$ with a finite impulse response (FIR) filter of the form $$t'_k = \frac{C}{\Delta\theta} \sum_{\substack{n=K_1 \\ n\neq 0}}^{K_2} A_n t_{k+n}, \tag{1A}$$

where constants C and $A_n$ are determined by a method described below. The values $K_1$ and $K_2$ are integers with $K_1$ less than $K_2$. Thus, the first derivative $t'_k$ at time $t_k$ may be generated from a linear combination of arrival times $t_{k+n}$, where n ranges from $K_1$ to $K_2$ with the exception that n≠0. The first derivative value $t'_k$ approximates the first derivative $dt/d\theta$ of time as a function of rotation angle of the rotating apparatus at the time $t_k$.

More generally, the first derivative $t'_k$ may be computed based on an FIR filter of the form $$t'_k = \frac{C}{\Delta\theta} \sum_{n\in S} A_n t_{k+n}, \tag{1B}$$

where index n runs through a set S of integer values different from zero.

An example of filter (1A) with $K_1=-2$ and $K_2=2$ is the following:

$$t'_k = \frac{1}{12\Delta\theta}[t_{k-2} - 8t_{k-1} + 8t_{k+1} - t_{k+2}]. \tag{2}$$

In this case, the first derivative $t'_k$ at time $t_k$ is computed based on the two previous arrival times and the two following arrival times. It is noted that multiplications by 8 may be implemented by bit shifting.

In step 355, signal analysis system 120 may determine the instantaneous rotation frequency $F_1(t_k)$ at time $t_k$ by reciprocating the first derivative estimate $t'_k$, i.e.

$$F_1(t_k)=1/t'_k. \tag{3}$$

The reciprocal computation may be performed according to any of a variety of techniques.

An analog-to-digital converter (e.g. one situated within data acquisition device 104) may digitize the transduced physical signal X. Let $T_J$ denote the sampling times for the samples $X(T_J)$ of the transduced physical signal X. Because multiple sampling times $T_J$ for the input signal X may occur between successive times of arrival $t_k$, signal analysis system 120 may use the rotation frequency values $F_1(t_k)$ computed at the arrival times $t_k$ to interpolate rotation frequency values $F_1(T_J)$ at sample times $T_J$ as indicated in step 360 of FIG. 8B, and as illustrated in FIG. 5C. FIG. 5C illustrates three successive times of arrival $t_0$, $t_1$, and $t_2$, and corresponding rotation frequency values $F_1(t_0)$, $F_1(t_1)$ and $F_1(t_2)$ denoted by small "x" symbols. Interpolated rotation frequency values $F(t_J)$ are denoted as small dots for sample times $T_0$ through $T_{10}$. Any of a variety of interpolation and/or filtering techniques may be used to determine the interpolated rotation frequency values $F(t_J)$.

As noted above, the instantaneous rotation frequency signal $F_1(t)$ tracks the order curve of order one (i.e. the fundamental order curve). Furthermore, an order curve of order C is determined by the corresponding multiple of the instantaneous rotation frequency signal, i.e. $C^*F_1(t)$. The order number C is a positive real number.

Derivative Filter Parameters

Figure 9:
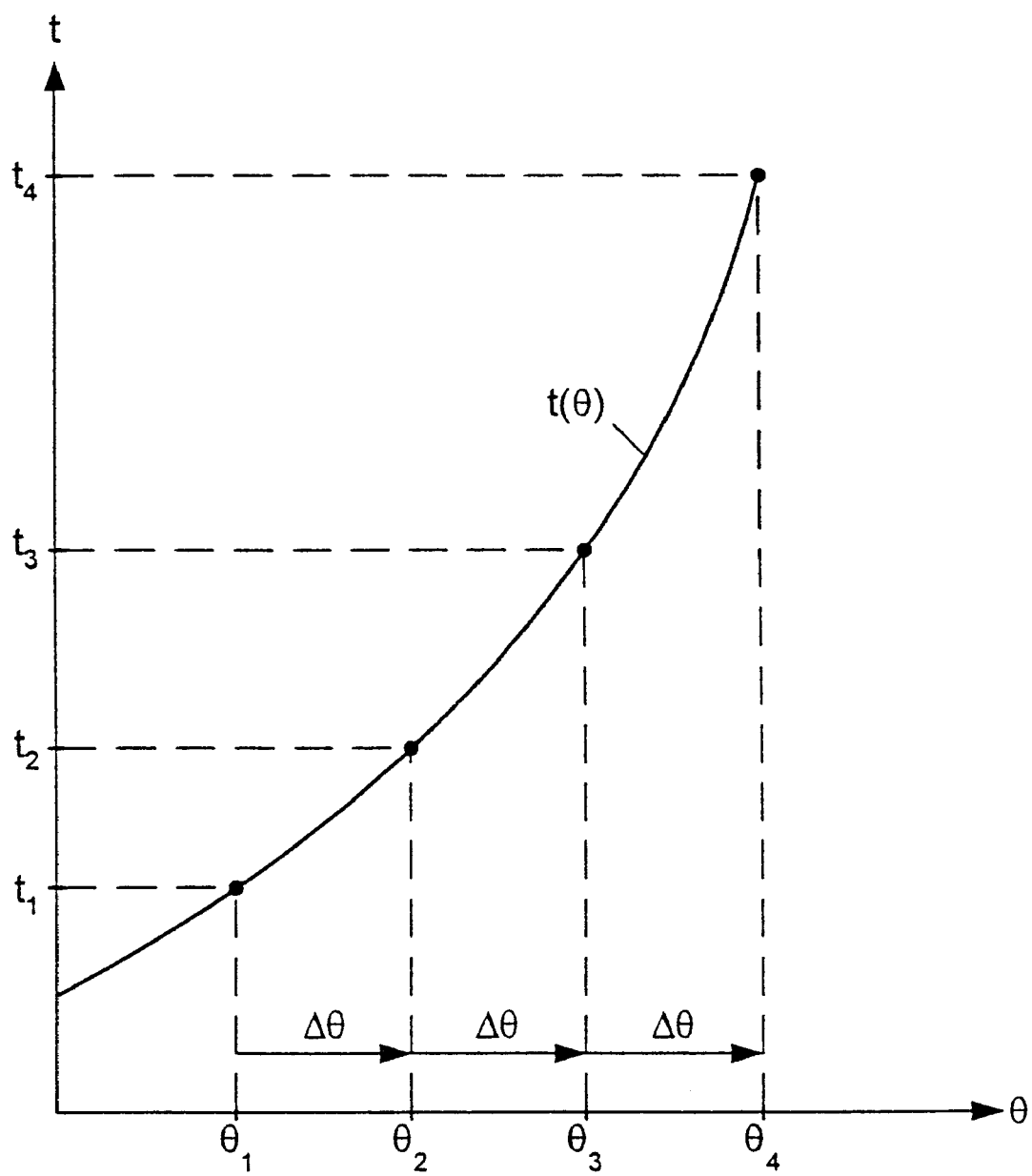
FIG. 9 illustrates time as a function of cumulative rotation angle of the rotating apparatus.

As noted above in connection with FIG. 2C, the cumulative rotation angle θ is a function of time t. However, it is just as valid to consider time t as a function of cumulative rotation angle θ as shown in FIG. 9. (Any increasing function is invertible). This inverse function is denoted $t(\theta)$. Let $\theta_1$ denote the cumulative rotation angle which corresponds to time $t_1$. Thus, $t_i = t(\theta_i)$ for any integer i. Observe that $\theta_{i+1} - \theta_i = \Delta\theta$ for any integer value i. More generally, $$\theta_{1+n} - \theta_1 = n^*\Delta\theta, \quad (4)$$

for any integers i and n. The function $t(\theta)$ may be approximated by a finite Taylor series in the neighborhood of $\theta = \theta_i$ as follows:

$$t(\theta) = t(\theta_i) + \sum_{k=1}^{M} \frac{t^{(k)}(\theta_i)}{k!} \cdot (\theta - \theta_i)^k, \quad (5)$$

where M is any positive integer and $t^{(k)}(\theta_i)$ denotes the $k^{th}$ derivative of function $t(\theta)$ at $\theta = \theta_1$. Observe that the derivatives $t^{(k)}(\theta_i)$ comprise a collection of M unknowns, but the function values $t(\theta)$ are known for $\theta = \theta_J$ where j is any integer, i.e. $t_J = t(\theta_J)$.

By substituting $\theta = \theta_{1+n}$ into equation (5), it follows that $$t(\theta_{i+n}) = t(\theta_i) + \sum_{k=1}^{M} \frac{t^{(k)}(\theta_i)}{k!} \cdot (\theta_{i+n} - \theta_i)^k. \quad (6)$$

However, relation (4) implies that $$t(\theta_{i+n}) = t(\theta_i) + \sum_{k=1}^{M} \frac{t^{(k)}(\theta_i)}{k!} \cdot (n\Delta\theta)^k. \quad (7)$$

Furthermore, applying the substitution $t_j = t(\theta_j)$ and rearranging terms gives $$t_{i+n} - t_i = \sum_{k=1}^{M} \frac{(n\Delta\theta)^k}{k!} \cdot t^{(k)}(\theta_i). \quad (8)$$

An invertible linear system LS arises when M distinct values for index n are substituted into equation (8). However, none of the M distinct values may equal zero, since n=0 gives a trivial equation of the form 0=0. For example, if M is even, the M non-zero integer values between −M/2 and M/2 inclusive may be substituted into equation (8) for index n to generate an invertible linear system with M equations and M unknowns. If M is odd, the M non-zero integer values between −(M−1)/2 to (M+1)/2 inclusive may be substituted into equation (8) for index n. A wide variety of choices are contemplated for integer M and for the set of M distinct integer values different from zero.

The linear system LS may be solved by any of a variety of techniques. The linear system may be summarized by the matrix-vector equation b=Gd, where b is a vector whose components are the time differences $t_{i+n} - t_i$, G is a matrix whose components are the coefficients $$\frac{(n\Delta\theta)^k}{k!},$$

and d is a vector whose components are the unknown derivatives $t^{(k)}(\theta_i)$. The linear system LS may be solved by inverting the matrix G to obtain an inverse matrix H. In terms of the inverse matrix H, the derivative vector d=Hb. FIG. 10A illustrates the linear system b=Hd in the case where M=4, and where index n takes the values −2, −1, 1 and 2. The corresponding inverse matrix H is illustrated in FIG. 10B. The first row of matrix H gives a formula for the first derivative, i.e.

$$t^{(1)}(\theta_i) = \frac{1}{12\Delta\theta}[(t_{i-2} - t_i) - 8(t_{i-1} - t_i) + 8(t_{i+1} - t_i) - (t_{i+2} - t_i)]. \quad (9)$$

However, this formula simplifies to $$t^{(1)}(\theta_i) = \frac{1}{12\Delta\theta}[t_{i-2} - 8t_{i-1} + 8t_{i+1} - t_{i+2}]. \quad (10)$$

This explains the origin of filter (2) described above.

It is noted that the complete linear system LS need not be solved in order to obtain the expression for the first derivative $t^{(1)}(\theta_i)$. In particular, the first derivative expression may be more simply derived by a series of row operations on the linear system LS. For example, in the case of FIG. 10A, a matrix manipulation algorithm may operate on the rows of the linear system LS to generate a reduced linear system as shown in FIG. 10C. The first row of the reduced system is obtained by subtracting the second row from the third row of the original linear system. The second row of the reduced system is obtained by subtracting the first row from the fourth row of the original linear system. Observe that the second derivative and fourth derivative terms of the reduced matrix are zero.

The third derivative term may be eliminated from the reduced system by subtracting the second row (of the reduced system) from eight times the first row of the reduced system. This row operation results in the expression $$12\Delta\theta t'(\theta_k) = 8t(\theta_{k+1}) - 8t(\theta_{k-1}) - t(\theta_{k+2}) + t(\theta_{k-2}) \quad (11)$$

which is equivalent to expression (10) above. The present invention contemplated automated methods for computing the first derivative expression (10) by an efficient sequence of row operations on the original linear system LS, where M has arbitrary order.

Figure 11:
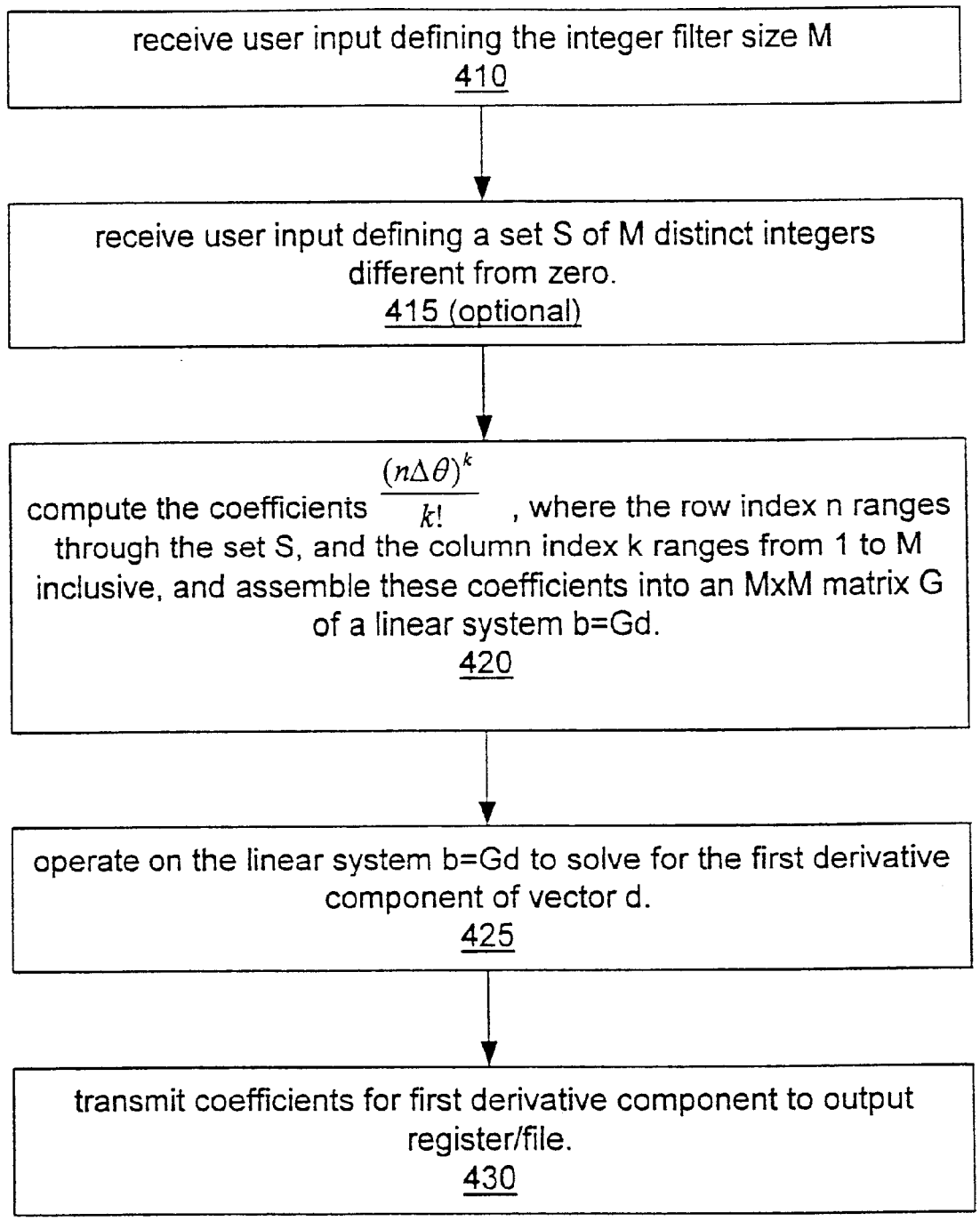
FIG. 11 illustrates one embodiment of a method for computing the coefficients of the FIR filter of step 350.

FIG. 11—Method for Computing Filter Parameters

FIG. 11 illustrates one embodiment of a method for determining the parameters for derivative estimation filter (1B). Recall that the form of filter (1B) is general enough to include filter (1A).

In step 410, signal analysis system 120 receives user input defining the integer filter size M. In step 415, signal analysis system 120 may receive user input defining a set S of M distinct integers different from zero. Step 415 is optional. If step 415 is not performed, signal analysis system 120 may use a default selection for the set S. For example, in the case where M is even, the set S may comprise the non-zero integers between −M/2 and M/2 inclusive. In the case where M is odd, the set S may comprise the non-zero integers between −(M−1)/2 and (M+1)/2. A variety of choices for the set S are contemplated. In step 420, signal analysis system 120 computes the coefficients $$\frac{(n\Delta\theta)^k}{k!},$$

where the index n ranges through the set S, and the index k ranges from 1 to M inclusive, and assembles these coefficients into an M×M matrix G defining a linear system b=Gd.

In step 425, signal analysis system 120 operates on the linear system b=Gd to solve for the first derivative component (e.g. the first entry) of vector d. For example, signal analysis system 120 may invert the matrix G to obtain an inverse matrix H. One of the rows (e.g. the first row) of the inverse matrix H corresponds to the first derivative component of vector d. The coefficients $E_n$ of this "first derivative" row define the coefficients $C^*A_n/\Delta\theta$ of filter (1B), i.e. $E_n = C^*A_n/\Delta\theta$. Signal analysis system 120 may extract factor C and values $A_n$ from the coefficients $E_n$. For example, signal analysis system 120 may select factor C so that values $A_n$ are integers having one as their greatest common divisor.

In one alternate embodiment of step 425, signal analysis system 120 may perform a more efficient series of row operations and system size reductions as suggested above on the linear system b=Gd to solve for only the first derivative term.

In step 430, signal analysis system 120 may transmit the coefficients for filter (1B) to an output register, memory buffer or output file.

In the description above, signal analysis system 120 is designated as the agent which performs the computational steps of FIG. 11. In other embodiments, another computer may perform these computational steps, and may transmit the resulting coefficients for filter (1B) to signal analysis system 120.

Estimating the Fundamental Frequency without Rotation Speed Information

In various alternate embodiments, the signal analysis system 120 estimates the instantaneous rotation frequency signal $F_1(t)$ without receiving any rotation speed information, i.e., without use of rotation sensing device RSD and rotation indicator signal R.

In one alternative embodiment, the signal analysis system 120 estimates the instantaneous rotation frequency signal $F_1(t)$ from transform data, i.e. from the first array of transform coefficients. For example, signal analysis system 120 may scan the first array of coefficients for a time-frequency curve with sufficient coefficient magnitude with the property that none of its integer submultiples have sufficient coefficient magnitude. The magnitude which is considered sufficient may depend on a user supplied (or program generated) threshold parameter. In this alternative embodiment, system configuration 100 may not require a rotation sensing device RSD, since signal analysis system 120 may be configured to compute an instantaneous rotation frequency signal $F_1(t)$ without use of rotation indicator signal R. By definition of order number, instantaneous rotation frequency signal $F_1(t)$ defines the order curve of order one (i.e. one cycle per rotation).

In a second alternative embodiment, signal analysis system 120 allows the user to identify the order curve of order one. For example, the user may designate one or more points on the order curve he/she believes to be the curve of order one. Signal analysis system 120 may apply an search algorithm which walks along the "top of the magnitude ridge" in order to determine the locus of the curve of order one from the selected point(s). Again, since the user identifies the order curve of order one, the rotation sensing device RSD and rotation indicator signal R may not be necessary.

In a third alternative embodiment, signal analysis system 120 allows the user to specify a plurality of points along the order curve he/she believes to the curve of order one. Signal analysis system 120 may fit the plurality of points with a smooth curve (e.g. a polynomial, a spline, etc.) to estimate the order curve of order one.

Computing Order Number in Response to Graphical User Input

As described above, signal analysis system 210 may receive user input specifying a desired order curve. For example, the user may select a point on a desired order curve in a displayed TF transform magnitude plot (as shown in FIG. 5). The coordinates (e.g. the horizontal and vertical pixel coordinates) of the selected point may be used to compute a corresponding time-frequency pair $(t_p, f_p)$ for the selected point. Signal analysis system 120 may evaluate (estimate or interpolate) an instantaneous rotation frequency value $F_1(t_p)$ appropriate for time $t_p$, and divide frequency $f_p$ by the evaluated instantaneous rotation frequency $F_1(t_p)$ in order to determine the order number of the desired order curve. In other words, the order number C of the desired order curve equals $f_p/F_1(t_p)$. In some embodiments, the user may enter the order number C of the desired order curve directly, and thus the computation of the order number C based on a selected point may not be necessary.

Time-Order Magnitude Plotting

As described above, signal analysis system 120 computes a joint time-frequency transform of the original input signal X. The transform function K(t,f) depends on time and frequency. Thus, it is natural to plot the magnitude of transform function K(t,f) as a function of time and frequency as shown in FIG. 5. However, to further reveal the order structure of the input signal X, it may be advantageous to plot magnitude of the transform as a function of time and order. Thus, signal analysis system 120 may compute coefficients for a function L(t,N) of time and order N according to the relation $$L(t,N)=K(t,N^*F_1(t)).$$

Figure 12:
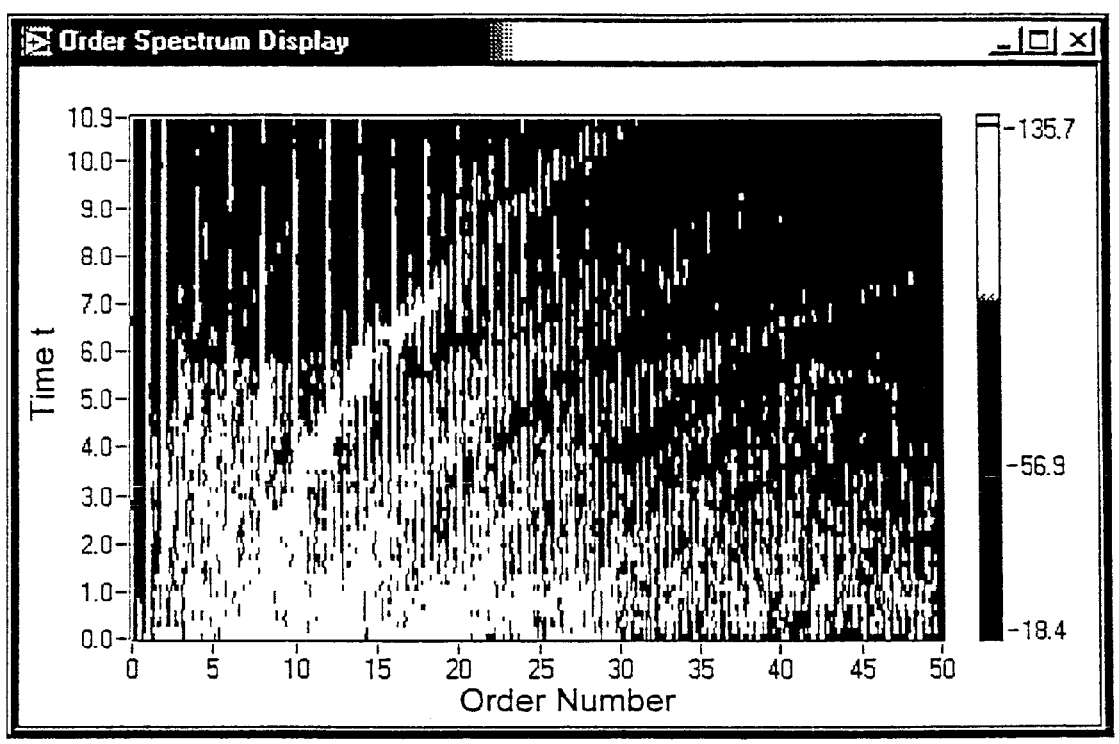
FIG. 12 presents a time-order transform magnitude plot for the same signal as depicted in FIG. 5.

In other words, each line of constant time at time t in the time-frequency plot may be contracted in frequency by a factor equal to the corresponding instantaneous rotation frequency F1(t). Order N may equal any rational number. Signal analysis system 120 may display the magnitude of time-order transform function L(t,N) as a function of time and order as shown in FIG. 12. Magnitude may be indicated by gray scale or by color along a color continuum. Because order number is the horizontal parameter in FIG. 12, order curves appear as vertical lines.

The user may be able to visually identify which orders have largest magnitude, smallest magnitude, etc. by observing the time-order transform magnitude display (as shown in FIG. 12). The user may provide an indication of an order curve which he/she desires to extract or suppress from the ambient signal X through user input device(s) UID. For example, the graphical user interface managed by signal analysis system 120 may provide adjustable cross hairs for the user to indicate desired positions within the displayed time-order transform magnitude display. The user may drag vertical and horizontal cross hairs with a pointing device (such as a mouse) until the cross hairs intersect at a point on a particular order curve. In addition (or alternatively), the user may move a screen cursor with a cursor control device (such as a mouse, trackball, etc.) until the cursor lies on a point a particular order curve. In response to a user selection event (e.g. clicking on a mouse button), signal analysis system 120 may receive horizontal and/or vertical coordinates of the selected point on the selected order curve. Signal analysis system 120 may compute an order number for the selected order curve from the coordinate(s) of the selected point. In some embodiments, the user may be able to enter an order number (e.g. on a numeric keypad) to select an order curve.

In one embodiment, signal analysis system 120 may be configured to extract as many order components as desired from the original signal X. For example, the user may select points on one or more order curves in a time-frequency (and/or time-order) transform magnitude plot. Signal analysis system 120 may compute order numbers for the selected order curves from the coordinates of the selected points as described above. Furthermore, the user may be able to enter one or more order numbers (e.g. on a numeric keypad) to select desired order curves. Signal analysis system 120 may compute a locus for the fundamental order curve (i.e. the order curve of order one) by any of various methods described herein, and may then compute a locus for each of the desired order curves by multiplying the fundamental order curve by the order numbers corresponding to the desired order curves. Furthermore, signal analysis system 120 may:

(a) construct an order mask which takes the value one in a time-frequency neighborhood of each of the selected (desired) order curves, and zero outside the union of these neighborhoods;

(b) mask the first array of transform coefficients with the order mask, thereby generating a second array (i.e. the modified array) of coefficients;

(c) apply an inverse joint time-frequency transform (e.g. inverse Gabor transform) to the second array of coefficients, thus generating a time-domain signal containing the desired order components;

(d) present the time-domain signal to the user through signal presentation device(s) SPD.

Figure 13A:
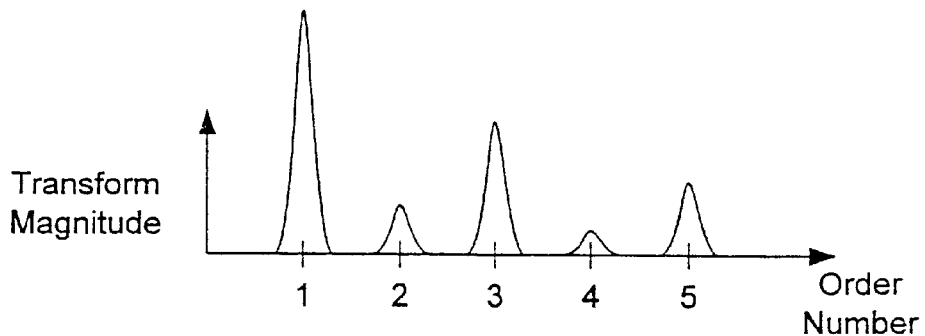
FIGS. 13A–E illustrate various embodiments of signal analysis system 120 in which one or more order components of the input signal X may be extracted from the input signal or suppressed in the input signal.

In FIG. 13A, a single time-slice of a time-order transform magnitude plot is displayed.

Figure 13B:
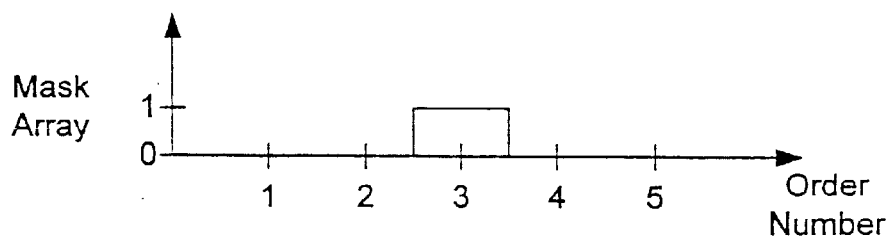

FIG. 13B illustrates an order mask generated by signal analysis system 120 in response to the user's selection of a single order component with order number equal to three. Signal analysis system 120 may mask the first array of transform coefficients with an order mask corresponding to FIG. 13B, and thus generate a second array of coefficients corresponding to only the third order component. The second array may be inverse transformed to generate samples of a time-domain signal. The time-domain signal comprises the third order component of the original signal X. This time-domain signal may be presented to the user through signal presentation device(s) SPD (e.g. a display and/or speaker). The order mask is preferably organized as an array of coefficients which depend on time and frequency just like the first array of coefficients (generated by transformation of the input signal). The illustration of the mask array in FIG. 13B as a function of order number succinctly characterizes the structure of the mask array, and does not necessarily imply that the mask array is stored as a function of order number. The same observation applies to the examples of FIGS. 13C through 13E.

Figure 13C:
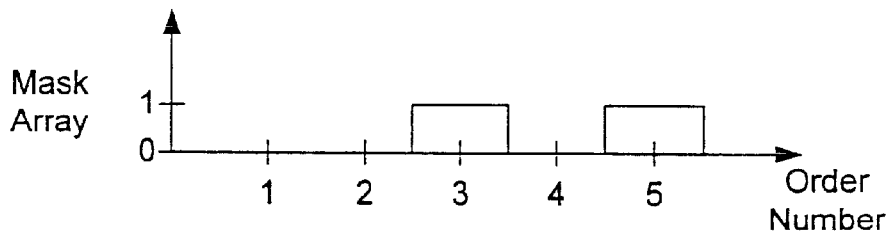

FIG. 13C illustrates an order mask generated by signal analysis system 120 in response to the user's selection of two order components with order numbers three and five respectively. Signal analysis system 120 may mask the first array of transform coefficients with the order mask indicated in FIG. 13C, and thus, generate a second array of coefficients corresponding to the third and fifth order components. The second array may be inverse transformed to generate samples of a time-domain signal. The time-domain signal comprises the third and fifth order components of the original signal X. This time-domain signal may be presented to the user through signal presentation device(s) SPD (e.g. a display and/or speaker).

In another embodiment, the user may provide input indicating order components to be masked or removed, thereby effectively selecting the remaining components for analysis (i.e. extraction). Thus, the user may provide an indication of one or more order curves which he/she desires to suppress (i.e. subtract) from the original signal X. The graphical user interface managed by signal analysis system 120 allows the user to graphically select one or more points on the one or more order curves which he/she desires to suppress from the original signal X. Signal analysis system 120 may compute order numbers for the selected order curves from the coordinates of the selected points as described above. Furthermore, the user may be able to enter one or more order numbers (e.g. on a numeric keypad) to select order curves. Signal analysis system 120 may compute the locus of the fundamental order curve (i.e. the order curve of order one) by any of various methods described herein, and may compute the locus of the selected order curves by multiplying the fundamental order curve by the order numbers corresponding to the selected order curves. Furthermore, signal analysis system 120 may:

(a) construct an order mask which takes the value zero in a time-frequency neighborhood of each of the selected order curves, and one outside the union of these neighborhoods;

(b) mask the first array of transform coefficient with the order mask, thereby generating a second array (i.e. the modified array) of coefficients;

(c) apply an inverse joint time-frequency transform (e.g. inverse Gabor transform) to the second array of coefficients, thus generating a time-domain signal which corresponds to the original signal X minus the selected order components;

(d) present the time-domain signal to the user through signal presentation device(s) SPD.

Figure 13D:
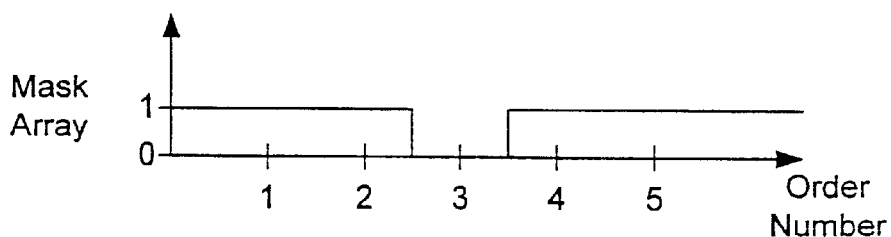

FIG. 13D illustrates an order mask generated by signal analysis system 120 in response to the user's selection of a single order component with order number equal to three for suppression from the original signal X. The order mask takes the value zero in a neighborhood of order number three and one outside this neighborhood. Signal analysis system 120 may mask the first array of transform coefficients with the order mask indicated in FIG. 13D, and thus, generate a second array of coefficients corresponding to the original signal X minus only the third order component. The second array may be inverse transformed to generate samples of a time-domain signal. The time-domain signal represents the original signal minus (i.e. without) the third order component. This time-domain signal may be presented to the user through signal presentation device(s) SPD (e.g. a display and/or speaker).

Figure 13E:
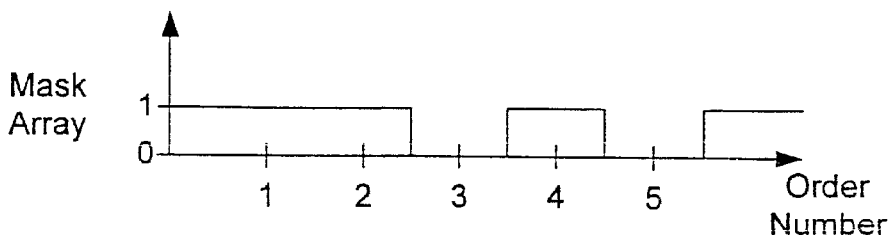

FIG. 13E illustrates an order mask generated by signal analysis system 120 in response to the user's selection of two order components with order numbers three and five respectively for suppression from the original signal X. The mask array takes the value zero in neighborhoods of order three and five, and the value one outside these neighborhoods. Signal analysis system 120 may mask the first array of transform coefficients with the order mask indicated in FIG. 13E, and thus, generate a second array of coefficients corresponding to the original signal X minus the third and fifth order components. The second array may be inverse transformed to generate samples of a time-domain signal. The time-domain signal represents the original signal minus (i.e. without) the third and fifth order components. This time-domain signal may be presented to the user through signal presentation device(s) SPD (e.g. a display and/or speaker).

As noted above, signal analysis system 120 is configured to extract or suppress any desired number of order components from the original signal X. The graphical user interface maintained by signal analysis system 120 may also allow the user to select order curves and/or order numbers, and to select per order curve (and/or per order number) whether the order curve is to be extracted or suppressed.

The present invention contemplates automated methods for selecting order components for extraction or suppression (i.e., programmatic selection of order components). For example, signal analysis system 120 may determine one or more order components having largest magnitudes, and may automatically extract (or suppress) these order components and suppress (or extract) the remaining order components. Signal analysis system 120 may be programmed by a user to search for order components having any desired set of properties, and to extract (i.e. to pass to the output) or suppress the discovered order components.

Scaling Function

In some embodiments, signal analysis system 120 may be configured to apply a scaling function to the first array of transform coefficients instead of (or in addition to) applying a binary-valued order mask as described above. The scaling function may serve to emphasize or de-emphasize selected order components. Signal analysis system 120 generates the scale array in response to user inputs, and multiplies the scale array by the first array of transform coefficients, thus generating a third array of coefficients. The third array of coefficients is inverse transformed. The resulting time-domain signal Y is presented to the user graphically and/or acoustically (i.e. through a display and/or a speaker).

Figure 14A:
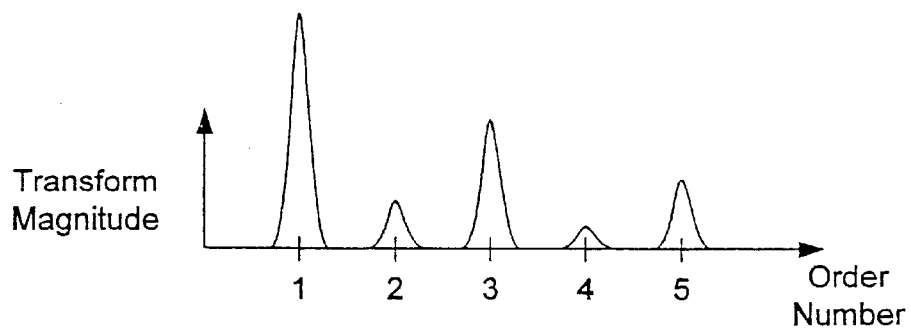
FIGS. 14A–E illustrate various embodiments of signal analysis system 120 in which one or more order components of the input signal X may be emphasized or de-emphasized by multiplying transform coefficients by a scaling function.
Figure 14B:
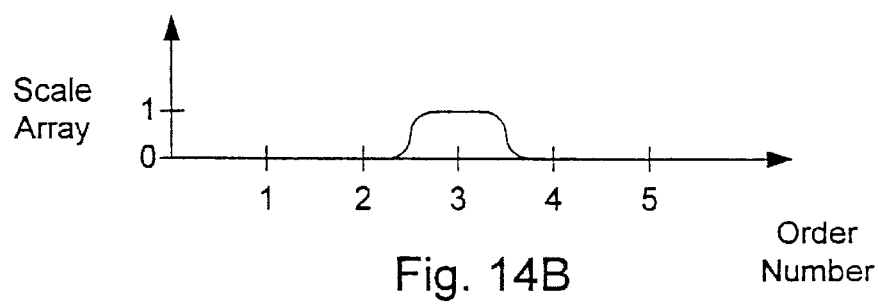

For example, FIG. 14A illustrates a transform magnitude plot of a signal at a single time-slice, and FIGS. 14B–E correspond to several of a variety of possible scale arrays (i.e. scaling functions). FIG. 14B corresponds to a scale array which is configured to extract order component three and to suppress all other order components. The scale array may have smooth transitions between band pass regions and band reject regions. The scale array is preferably organized as an array of coefficients which depend on time and frequency just like the first array of coefficients. The illustration of the scale array in FIG. 14B as a function of order number succinctly characterizes the structure of the scale array, and does not necessarily imply that the scale array is stored or accessed as a function of order number. The same observation applies to the examples of FIGS. 14C through 14E.

Figure 14C:
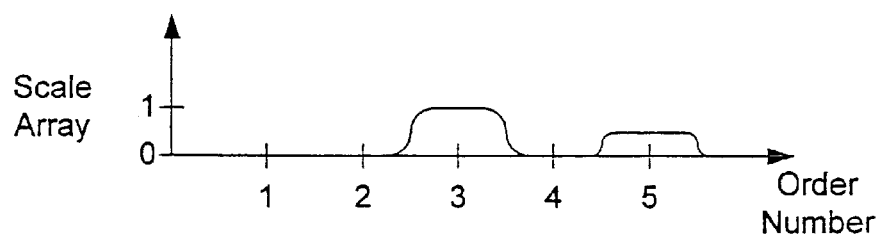
Figure 14D:
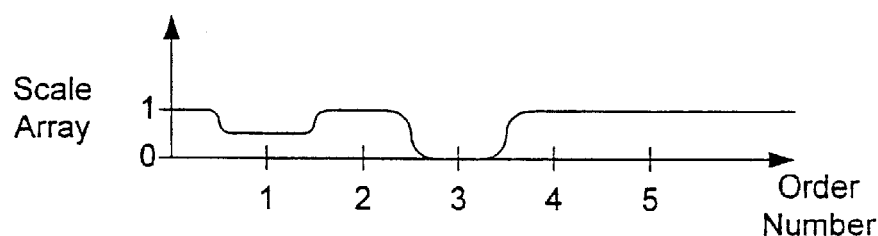
Figure 14E:
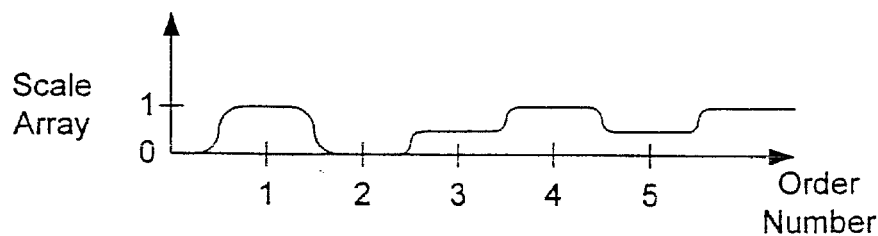

FIG. 14C corresponds to a scale array which is configured to pass order component three, to attenuate order component five by a factor of ½ and to reject all other order components. FIG. 14D corresponds to a scale array which is configured to reject order component three, to attenuate order component one, and to pass all other orders. FIG. 14E corresponds to a scale array which is configured to pass order components one, four and any order components above five, to attenuate order components three and five, and to reject order component two and order components below one. Arbitrary scaling arrays are contemplated. The user may specify the properties of a scaling array to achieve any desired effect on one or more order components of the original signal X. For example, the user may specify an order curve (e.g. by selecting a point on the order curve), and assign a scaling value to the order curve, i.e. a real number value which determines by how much the order curve is to be amplified and/or attenuated. The scaling value may be entered in terms of decibels, or any other convenient set of units.

While the above examples have illustrated masking and/or scaling of order components having integer order numbers, it is understood that masking and/or scaling of order components having non-integer order numbers may be performed just as easily.

Engine Noise Example

The following is an example of the operation of one embodiment of the present invention in an automobile engine application. Consider a situation where a user desires to reduce the engine noise in the engine of an automobile. In this case, the user may arrange one or more microphones proximate to the engine and acquire signals from these microphones. The user may then iteratively select various order components of the acquired signals to analyze or listen to in order to determine what components of the acquired signals contribute most to the engine noise. Alternatively, the user may iteratively select various order components of the acquired signals to mask out or remove from the input signal, and then listen to the input signal minus these components. Thus the user may be able to determine which components of the acquired signals contribute most to the engine noise. The user may then adjust the engine in various ways, such as changing the design of the engine, replacing one or more components of the mechanical system, predicting a failure of one or more components of the mechanical system, and/or adding a sound-absorbent material to one or more locations of the mechanical system to reduce the engine noise.

Analyzing Multiple Order Component Families from an Acquired Signal

In one embodiment, the system and method is operable to analyze multiple order component families from an acquired signal. For example, an acquired signal may contain information from two or more independent signal sources or two or more different rotating elements, e.g., two or more different engines. The order components associated or originating from a respective source, such as a respective rotating element, may be referred to as an "order family". In this instance, each order family may be responsive to the rotation rate of the corresponding rotating element. These respective order families may be analyzed independently using the methods described above. For example, the user may visually distinguish order components from these different order families in a visual representation of the time-frequency coefficients (the first array of coefficients) and the user may select different order components from these order families for analysis. In one embodiment, the signal analysis system may acquire a rotation indication signal for each rotating element, and compute corresponding instantaneous rotation frequency signals for each rotating element. The order components in each order family may be multiples of the corresponding fundamental order as determined from the corresponding instantaneous rotation frequency signal.

Method for Determining Instantaneous Rotation Frequency

The filtering method described herein for determining the instantaneous rotation frequency of a rotating apparatus based on filtering a stream of arrival times provided by a rotation indicator signal (e.g. a tachometer signal) may be applied in a wide variety of contexts, i.e. not only in the domain of order component analysis. For example, the instantaneous rotation frequency signal generated by this filtering method may be used to analyze the performance/behavior of mechanical systems such as motors, wheels, disk drives, fans, circular saws, etc.

The filtering method of the present invention may be incorporated in any of a variety of systems such as a measurement device, a signal analyzer, a test instrument, etc. for more accurate estimation of instantaneous rotation rates. The filtering method may be implemented with programmable hardware such as a microprocessor, or in dedicated hardware.

Although the system and method of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A system for analyzing the operation of a rotating apparatus in a mechanical system, the system comprising:
   an input for receiving samples of an input signal, wherein the input signal is acquired from the mechanical system containing the rotating apparatus, wherein the input signal is sampled in time, wherein the input signal comprises a plurality of order components;
   a processor coupled to the input;
   a memory medium coupled to the processor which stores analysis software;
   wherein the processor is operable to execute the analysis software to:
      perform an invertible joint time-frequency transform on the input signal to produce a first array of coefficients which depend on time and frequency;
      generate a modified array of coefficients from the first array of coefficients, wherein the modified array of coefficients corresponds to a desired subset of the plurality of order components; and
      generate a time domain signal from the modified array of coefficients; and
   a presentation device coupled to the processor which is operable to present the time domain signal to a user;
   wherein the time domain signal is useable in analyzing operation of the rotating apparatus in the mechanical system.

2. The system of claim 1, wherein said generating the modified array of coefficients includes selecting the desired subset of the plurality of order components.

3. The system of claim 1, wherein, in generating the modified array of coefficients, the processor is operable to:
   determine coefficient positions from the first array which correspond to the desired subset of the plurality of order components in the input signal, and
   set coefficients of said modified array equal to zero at positions other than said coefficient positions.

4. The system of claim 3, wherein, in generating the modified array of coefficients, the processor is operable to set coefficients of the modified array equal to coefficients of the first array at said coefficient positions.

5. The system of claim 1, further comprising a user input device coupled to the processor, wherein, in response to execution of the analysis software, the processor is operable to receive user input from the user input device, wherein the user input specifies the desired subset of the plurality of order components.

6. The system of claim 1, further comprising a user input device coupled to the processor, wherein, in response to execution of the analysis software, the processor is operable to receive user input from the user input device, wherein the user input specifies a second subset of the plurality of order components in the input signal for removal, wherein the desired subset of the plurality of order components corresponds to order components of the input signal which are not included in the second subset of the plurality of order components.

7. The system of claim 1, further comprising:
   a display configured to display a visual representation of the first array of coefficients, wherein the visual representation indicates at least one of the plurality of order components;
   an input device, wherein the processor is operable to receive user input from the input device, wherein the user input indicates a user's selection of one or more points in the visual representation, wherein said user input operates to define the desired subset of the plurality of order components.

8. The system of claim 1, wherein each of the order components in the input signal comprises a rotation-periodic signal present in the input signal.

9. The system of claim 1, wherein, in generating the time domain signal from the modified array of coefficients, the processor is operable to execute the analysis software to perform an inverse joint time-frequency transform on the modified array of coefficients.

10. The system of claim 1, wherein the joint time-frequency transform comprises the Gabor transform.

11. The system of claim 1,
   wherein the presentation device is a display device operable to visually display the time domain signal.

12. The system of claim 1,
   wherein the presentation device is a speaker operable to audially present the time domain signal.

13. The system of claim 1, wherein the mechanical system is operable to be adjusted in response to analysis of the time domain signal.

14. The system of claim 13, wherein adjustment of the mechanical system comprises one or more of: 1) changing a design of the mechanical system; 2) replacing one or more components of the mechanical system; 3) predicting a failure of one or more components of the mechanical system; and 4) adding a sound-absorbent material to one or more locations of the mechanical system.

15. The system of claim 1, wherein the input signal comprises a signal generated by a microphone proximate to the mechanical system.

16. The system of claim 1, wherein, in generating the modified array of coefficients, the processor is operable to:
- determine coefficient positions from the first array which correspond to the desired subset of the plurality of order components in the input signal;
- compute an instantaneous rotation frequency signal with respect to time, wherein the instantaneous rotation frequency signal corresponds to a fundamental order component of the input signal;
- multiply the instantaneous rotation frequency signal by one or more order numbers to generate one or more order curves, wherein the one or more order curves determine the coefficient positions from the first array.

17. The system of claim 16, wherein said coefficient positions from the first array comprise positions of the first array which reside in the union of neighborhoods containing the one or more order curves respectively, wherein said one or more order curves define the desired subset of the plurality of order components.

18. The system of claim 16, wherein said coefficient positions from the first array comprise positions of the first array which reside in the complement of the union of neighborhoods containing the one or more order curves, wherein said one or more order curves correspond to order components of the input signal which are not in the desired subset of the plurality of order components.

19. The system of claim 16, wherein said one or more order numbers are determined in response to user input.

20. The system of claim 16, further comprising a rotation sensing device coupled to the processor, and configured to provide a first signal comprising a stream of arrival times to the processor, wherein each pair of successive arrival times in said stream indicates a constant angular displacement of said rotating apparatus;
- where said processor is operable to compute the instantaneous rotation frequency signal by filtering the arrival times to determine a stream of derivative estimates, wherein the instantaneous rotation frequency signal is determined from said stream of derivative estimates.

21. The system of claim 20, wherein said processor is operable to filter with arrival times with an FIR filter; wherein coefficients of said FIR filter are determined by operating on a linear system derived from a Taylor series expansion of time with respect to rotation angle of the rotating element.

22. The system of claim 21, wherein matrix coefficients of the linear system have the form $$\frac{(n\Delta\theta)^k}{k!},$$

where index k ranges from 1 to an upper limit M, wherein index k ranges through a set of M distinct integer values different from zero.

23. The system of claim 22, wherein M is even and the set of M distinct integers comprises the non-zero integer values between $-M/2$ and $M/2$ inclusive.

24. The system of claim 20, wherein, in filtering said arrival times, said processor is configured to compute the expression $t_{k-2} - 8t_{k-1} + 8t_{k+1} - t_{k+2}$ for a first arrival time $t_k$, wherein $t_{k-1}$ is a first previous arrival time, wherein $t_{k-2}$ is a second previous arrival time, wherein $t_{k+1}$ is a first following arrival time, wherein $t_{k+2}$ is a second following arrival time.

25. The system of claim 20, wherein, in response to execution of the analysis software, the processor is further operable to compute the instantaneous rotation frequency by reciprocating the stream of derivative estimates.

26. The system of claim 25, wherein, in response to execution of the analysis software, the processor is further operable to interpolate the reciprocated derivative estimates to determine rotation frequency values at a series of samples times.

27. The system of claim 16, wherein, in computing the instantaneous rotation frequency signal, said processor is operable to search the first array of coefficients according to one or more search criteria.

28. The system of claim 16, wherein, in computing the instantaneous rotation frequency signal, said processor is operable to:
- receive a rotation indicator signal indicative of rotations of the rotating apparatus;
- operate on the rotation indicator signal to determine values of the instantaneous rotation frequency signal.

* * * * *

UNITED STATES PATENT AND TRADEMARK OFFICE
CERTIFICATE OF CORRECTION

PATENT NO.   : 6,453,273 B1
DATED        : September 17, 2002
INVENTOR(S)  : Qian et al.

It is certified that error appears in the above-identified patent and that said Letters Patent is hereby corrected as shown below:

<u>Column 28,</u>
Line 3, please delete "senes" and substitute -- series --.

Signed and Sealed this

Eleventh Day of February, 2003

JAMES E. ROGAN
*Director of the United States Patent and Trademark Office*